(12) United States Patent
Sakurada et al.

(10) Patent No.: US 10,543,676 B2
(45) Date of Patent: Jan. 28, 2020

(54) IMAGE RECORDING METHOD, AND TRANSFER ASSISTING LIQUID AND LIQUID SET USED THEREFOR

(71) Applicant: CANON KABUSHIKI KAISHA, Tokyo (JP)

(72) Inventors: Shinichi Sakurada, Tokyo (JP); Shota Tanaka, Kawasaki (JP); Takashi Imai, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 120 days.

(21) Appl. No.: 15/712,496

(22) Filed: Sep. 22, 2017

(65) Prior Publication Data

US 2018/0093469 A1 Apr. 5, 2018

(30) Foreign Application Priority Data

Sep. 30, 2016 (JP) ................. 2016-194469

(51) Int. Cl.
*B41J 2/005* (2006.01)
*B41J 2/01* (2006.01)
(Continued)

(52) U.S. Cl.
CPC ............. *B41J 2/0057* (2013.01); *B41J 2/01* (2013.01); *B41J 2/17593* (2013.01);
(Continued)

(58) Field of Classification Search
CPC ........ B41J 2/0057; B41J 2/01; B41J 2/17593; B41J 2002/012; B41J 11/002;
(Continued)

(56) References Cited

U.S. PATENT DOCUMENTS 7,281,790 B2 10/2007 Mouri et al.
8,362,108 B2 1/2013 Imai
(Continued)

FOREIGN PATENT DOCUMENTS

| EP | 2 939 842 A1 | 11/2015 |
|---|---|---|
| JP | 4834300 B2 | 12/2011 |
| WO | 2008/048438 A1 | 4/2008 |

OTHER PUBLICATIONS

BASF, The Chemical Company, Printing & Packaging Resins & Performance Additives, Joncryl® Acrylic Resins, p. 4, BASF Corporation, Wyandotte, MI (2013).
(Continued)

*Primary Examiner* — Huan H Tran
(74) *Attorney, Agent, or Firm* — Venable LLP

(57) ABSTRACT

An image recording method includes a first intermediate image forming step of applying an ink onto an intermediate transfer member to form a first intermediate image, a second intermediate image forming step of applying a transfer assisting liquid containing thermoplastic resin particles and rosin-based resin particles to the first intermediate image formed on the intermediate transfer member to form a second intermediate image, and a transfer step of bringing the second intermediate image formed on the intermediate transfer member into contact with a recording medium, peeling off the second intermediate image from the intermediate transfer member while the contact state with the recording medium is maintained, and transferring the second intermediate image to the recording medium. In the transfer step, the second intermediate image brought into contact with the recording medium has a temperature not less than the glass transition temperature of the thermoplastic resin particles.

23 Claims, 4 Drawing Sheets

(51) Int. Cl.
  *B41J 2/175* (2006.01)
  *B41J 11/00* (2006.01)
  *B41M 5/00* (2006.01)
  *C09D 11/30* (2014.01)

(52) U.S. Cl.
  CPC ........ *B41J 11/002* (2013.01); *B41J 2002/012* (2013.01); *B41M 5/0017* (2013.01); *B41M 2205/38* (2013.01); *C09D 11/30* (2013.01)

(58) Field of Classification Search
  CPC ....... C09D 11/322; C09D 11/54; C09D 11/30; B41M 2205/10; B41M 5/025; B41M 5/0256; B41M 5/03; B41M 2205/38; B41M 5/0017
  See application file for complete search history.

(56) References Cited

U.S. PATENT DOCUMENTS

| | | | | |
|---|---|---|---|---|
| 9,352,554 | B2 * | 5/2016 | Goto | ............... B41J 2/0057 |
| 9,533,490 | B2 | 1/2017 | Goto | |
| 10,046,555 | B2 * | 8/2018 | Goto | ............... B41M 5/0017 |
| 10,046,556 | B2 * | 8/2018 | Soma | ............... B41J 2/0057 |
| 10,081,175 | B2 * | 9/2018 | Sakurada | ............ B41J 2/0057 |
| 2005/0110856 | A1 | 5/2005 | Mouri et al. | |
| 2007/0165204 | A1 | 7/2007 | Kibayashi et al. | |
| 2008/0092776 | A1 | 4/2008 | Stockl et al. | |
| 2013/0250021 | A1 | 9/2013 | Shimomura et al. | |
| 2014/0114574 | A1 * | 4/2014 | Tertoolen | ............ G01C 21/367 |
| | | | | 701/533 |
| 2014/0320573 | A1 * | 10/2014 | Kaji | .................. B41J 2/0057 |
| | | | | 347/103 |
| 2015/0314590 | A1 * | 11/2015 | Goto | ................. B41J 2/0057 |
| | | | | 347/103 |
| 2016/0243819 | A1 | 8/2016 | Goto | |
| 2016/0303847 | A1 * | 10/2016 | Soma | ............... B41J 2/0057 |
| 2017/0282533 | A1 * | 10/2017 | Sakurada | ........... B41J 2/0057 |
| 2017/0297347 | A1 | 10/2017 | Torisaka et al. | |
| 2018/0304615 | A1 * | 10/2018 | Soma | ............... B41J 2/0057 |

OTHER PUBLICATIONS

Eastman, Technical Data Sheet, Foral™ AX-E Fully Hydrogenated Rosin, Eastman Chemical Company, USA (Jan. 7, 2011).
Feb. 23, 2018 extended European Search Report in European Patent Appln. No. 17193388.0.

* cited by examiner

FIG. 1

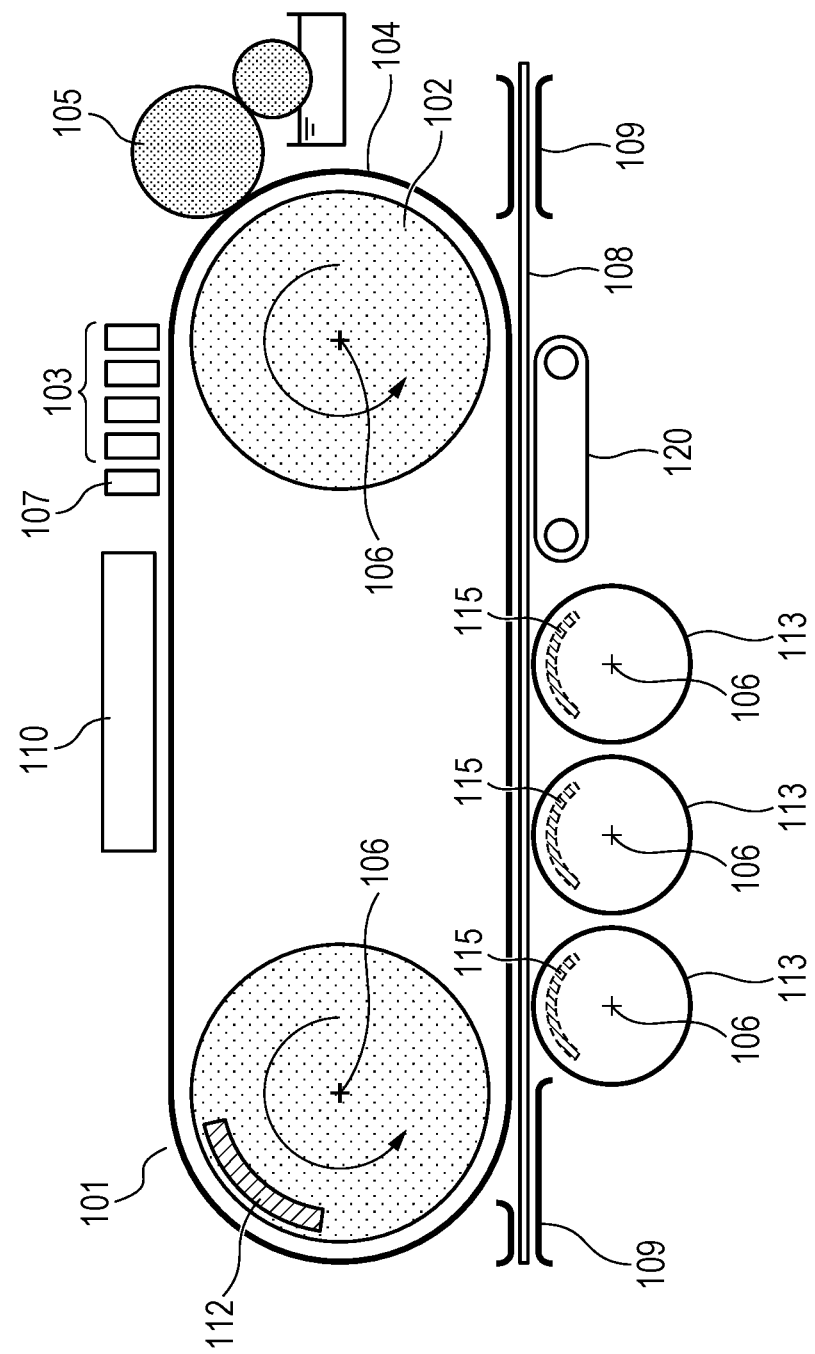

IMAGE RECORDING METHOD, AND TRANSFER ASSISTING LIQUID AND LIQUID SET USED THEREFOR

BACKGROUND OF THE INVENTION

Field of the Invention

The present invention relates to an image recording method and to a transfer assisting liquid and a liquid set used for the method.

Description of the Related Art

Ink jet recording apparatuses have been widely used as output apparatuses for computers and the like from the viewpoint that the running cost is low and the apparatuses can be downsized and easily applied to color image recording using a plurality of color inks. In recent years, there is a demand for image recording apparatuses capable of outputting high quality images at high speeds regardless of the types of recording media. In order to output high quality images at high speeds, it is required to suppress image degradation by feathering in which inks spread along fibers of a recording medium, for example.

As one technology for solving the problem, transfer-type image recording apparatuses including an intermediate transfer member are known. In the transfer-type ink jet image recording apparatus using the transfer system, an intermediate image is formed on an intermediate transfer member by an ink jet method. The intermediate image on the intermediate transfer member is next dried and transferred onto a recording medium, and a final image is recorded on the recording medium. In the image recording method using the transfer system, an intermediate image is dried on an intermediate transfer member, and thus high-quality images can be recorded at high speed on various recording media such as recording paper. This method is unlikely to cause feathering, which is a problem caused when an image is output directly on a recording medium at high speed.

In order to record high quality images on recording media by the transfer-type image recording apparatus, the apparatus is required to have high transfer efficiency of an intermediate image from an intermediate transfer member. The transfer efficiency of an intermediate image is also important in recording a high-quality image at high speed. For example, when an apparatus causes defective transfer of failing to transfer a part of an intermediate image on an intermediate transfer member or causes incomplete transfer of separating an intermediate image therein into a segment on an intermediate transfer member and another segment on a recording medium, the apparatus is difficult to achieve satisfactory transfer efficiency.

Japanese Patent No. 4834300 discloses an ink jet recording apparatus including an assisting liquid applying device that applies an assisting liquid containing a water-soluble resin to an intermediate transfer member for an improvement of abrasion resistance of images. Japanese Patent No. 4834300 discloses that application of the assisting liquid before the formation of an intermediate image improves the releasability between an intermediate transfer member and an intermediate image. The document also discloses that application of the assisting liquid after the formation of an intermediate image improves the adhesiveness between a recording medium and an intermediate image, and thus is advantageous in terms of transfer efficiency.

SUMMARY OF THE INVENTION

The present invention is directed to providing an image recording method enabling an improvement of the transfer efficiency of an intermediate image to a recording medium and enabling stable recording of an image having an intended image quality on a recording medium and a transfer assisting liquid and a liquid set for transfer-type image recording.

An aspect of the present invention provides an image recording method including
a first intermediate image forming step of applying an ink onto an intermediate transfer member to form a first intermediate image,
a second intermediate image forming step of applying a transfer assisting liquid containing thermoplastic resin particles and rosin-based resin particles to the first intermediate image formed on the intermediate transfer member to form a second intermediate image, and
a transfer step of bringing the second intermediate image formed on the intermediate transfer member into contact with a recording medium, peeling off the second intermediate image from the intermediate transfer member while a contact state with the recording medium is maintained, and transferring the second intermediate image to the recording medium.

In the transfer step, the second intermediate image brought into contact with the recording medium has a temperature not less than a glass transition temperature of the thermoplastic resin particles.

Another aspect of the present invention provides a transfer assisting liquid for transfer-type image recording, and the transfer assisting liquid includes thermoplastic resin particles and rosin-based resin particles.

Still another aspect of the present invention provides a liquid set for transfer-type image recording, and the liquid set includes a transfer assisting liquid including thermoplastic resin particles and rosin-based resin particles and an ink.

Further features of the present invention will become apparent from the following description of exemplary embodiments with reference to the attached drawings.

BRIEF DESCRIPTION OF THE DRAWINGS

FIG. 1 is a schematic view showing an image recording apparatus pertaining to an embodiment of the present invention.

FIG. 4 is a schematic view showing an image recording apparatus pertaining to an embodiment of the present invention.

DESCRIPTION OF THE EMBODIMENTS

Figure 2:
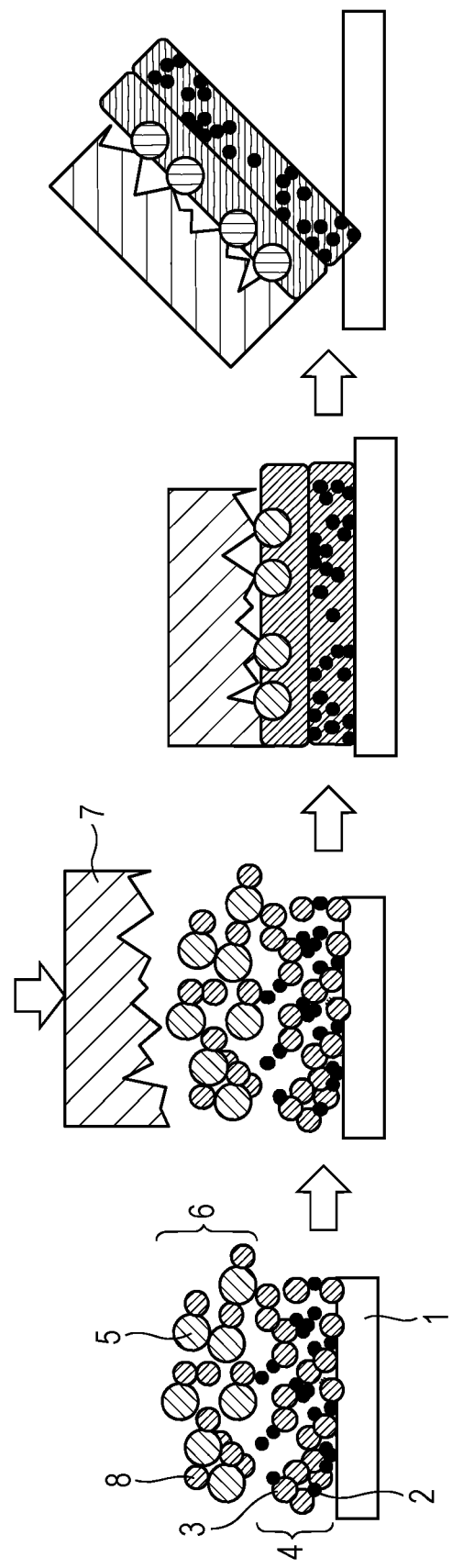
FIGS. 2A, 2B, 2C and 2D are schematic views for describing the action of a transfer assisting liquid of the present invention.

Preferred embodiments of the present invention will now be described in detail in accordance with the accompanying drawings.

As described above, in order to stably record high quality images on recording media by using a transfer-type image recording apparatus, it is important to further improve the transfer efficiency of an intermediate image from an intermediate transfer member to a recording medium. For example, even when intermediate images are formed from various materials or have various shapes, it is required to achieve satisfactory transfer efficiency. The inventors of the present invention have intensively studied to provide an image recording method enabling an improvement of the transfer efficiency of an intermediate image to a recording medium and enabling stable recording of an image having an intended image quality on a recording medium, and consequently have completed the present invention.

The image recording method of the present invention includes the following steps.

(A) A step of applying an ink onto an intermediate transfer member to form a first intermediate image (first intermediate image forming step).

(B) A step of applying a transfer assisting liquid containing thermoplastic resin particles and rosin-based resin particles to the first intermediate image formed on the intermediate transfer member to form a second intermediate image (second intermediate image forming step).

(C) A step of bringing the second intermediate image formed on the intermediate transfer member into contact with a recording medium, peeling off the second intermediate image from the intermediate transfer member while the contact state with the recording medium is maintained, and transferring the second intermediate image to the recording medium (transfer step).

In the step (B), the transfer assisting liquid is applied to the first intermediate image formed on the intermediate transfer member in order to improve the transfer efficiency of the second intermediate image from the intermediate transfer member to the recording medium. The improvement of the transfer efficiency of the second intermediate image by the transfer assisting liquid is achieved by addition of the thermoplastic resin particles and the rosin-based resin particles contained in the transfer assisting liquid to the first intermediate image, softening or partial fusion of the thermoplastic resin particles in the second intermediate image, and reinforcement of the adhesiveness of the second intermediate image to the recording medium by the rosin-based resin particles.

In the present invention, an intermediate image before application of the transfer assisting liquid is called first intermediate image, whereas an intermediate image after application of the transfer assisting liquid is called second intermediate image. The first intermediate image and the second intermediate image are also collectively called "intermediate image". In the following description, the transfer assisting liquid is also simply called assisting liquid.

The image recording method of the present invention is characterized by performing the following temperature control in the transfer step (C).

(D) The second intermediate image brought into contact with the recording medium is controlled to have a temperature Tc not less than the glass transition temperature (Tg) of the thermoplastic resin particles contained in the assisting liquid.

Here, the temperature Tc of the second intermediate image brought into contact with the recording medium is the temperature of the second intermediate image during the contact state with the recording medium after the second intermediate image comes into contact with the recording medium and before the second intermediate image is peeled off from the intermediate transfer member. The temperature Tc of the second intermediate image is required to be not less than Tg of the thermoplastic resin particles at least some time during the contact state with a recording medium. In other words, the second intermediate image may be controlled to have the temperature during the whole period in the contact state, or may be controlled to have the temperature some time during the contact state with a recording medium.

A supposed mechanism of achieving the effect of the invention will be described with reference to FIGS. 2A to 2D. FIGS. 2A to 2D are views describing the behavior of each component in the temperature control (D) in a model case of using an ink containing resin particles for improving the strength of an image and a pigment as a coloring material and using an assisting liquid containing thermoplastic resin particles and rosin-based resin particles.

On an image formation surface of an intermediate transfer member 1, an ink aggregate layer 4 as the first intermediate image is formed. The ink aggregate layer 4 contains a pigment 2 and resin particles 3. FIGS. 2A to 2D show an example using, as the resin particles 3, the same thermoplastic resin particles as the thermoplastic resin particles contained in the assisting liquid. By applying the assisting liquid onto the ink aggregate layer 4, thermoplastic resin particles 8 and rosin-based resin particles 5 are supplied to form an assisting liquid aggregate layer 6. As a result, a second intermediate image having the structure shown in FIG. 2A is obtained. Next, with the side on which the assisting liquid aggregate layer 6 is formed on the ink aggregate layer 4, a recording medium 7 is brought into contact. In this state, the ink aggregate layer 4 and the assisting liquid aggregate layer 6 are heated so as to give a temperature condition satisfying Tc≥Tg (Tc is the temperature of the second intermediate image brought into contact with the recording medium, and Tg is the glass transition temperature of the thermoplastic resin particles 8), and concurrently the recording medium 7 is pressed against the assisting liquid aggregate layer 6. The ink aggregate layer 4 and the assisting liquid aggregate layer 6 can be heated in the state shown in FIG. 2B and/or FIG. 2C. By heating, the thermoplastic resin particles 8 contained in the assisting liquid aggregate layer 6 soften and flow to increase the adhesion area of the interface between the recording medium 7 and the ink aggregate layer 4. In addition, partial or complete fusion of the thermoplastic resin particles 8 allows the assisting liquid aggregate layer 6 to express sufficient strength, maintaining the adhesion state between the ink aggregate layer 4 and the recording medium 7 as shown in FIG. 2C. In the state of higher adhesiveness between the ink aggregate layer 4 and the recording medium 7, the second intermediate image is then peeled off from the intermediate transfer member 1 and transferred to the recording medium 7, as shown in FIG. 2D.

At the time, the assisting liquid aggregate layer 6 assisting the adhesion state contains the rosin-based resin particles together with the thermoplastic resin particles, and expresses a strong hydrophobic interaction between the rosin-based resin particles and the recording medium, and thus the interfacial peeling between the second intermediate image and the recording medium is unlikely to be caused. As a result, it is supposed that the transfer efficiency of the second intermediate image to the recording medium is improved, and excellent images can be stably transferred.

Although the reason why the rosin-based resin particles function to increase the hydrophobic interaction to the recording medium is unclear, the inventors of the present invention consider the reason as follows: In general, in order to prevent ink bleeding by writing with a fountain pen or the like on plain paper, coated paper, and general printing paper, a sizing agent having high hydrophobicity is added to cellulose, which is paper fibers having high hydrophilicity, and the sizing agent functions to maintain the hydrophobicity of the surface of a recording medium. It is thus supposed that the rosin-based resin particles also have a similar function to that of the sizing agent and thus can express strong interaction to the surface of a recording medium.

The first intermediate image forming step of forming a first intermediate image on an intermediate transfer member includes a step of applying an ink to an image formation surface of the intermediate transfer member. The first intermediate image forming step preferably further includes a step of applying a reaction liquid containing an ink-viscosity-increasing component to the image formation surface of the intermediate transfer member. The reaction liquid and the ink are applied to the intermediate transfer member in such a way that a region where the reaction liquid is applied at least partly overlaps with a region where the ink is applied. The reaction liquid can be applied to the intermediate transfer member at least one of before the application of the ink to the intermediate transfer member and after the application of the ink, and the reaction liquid is preferably applied before the application of the ink to the intermediate transfer member. In other words, the first intermediate image forming step preferably includes a step of applying a reaction liquid onto the intermediate transfer member and a step of applying an ink onto the intermediate transfer member with the reaction liquid. The step of applying an ink can be performed by an ink jet method.

An image recording apparatus applicable to the image recording method pertaining to the present invention will next be described. The image recording apparatus of the present invention includes the following members.

(a) An image forming unit for forming a first intermediate image on an intermediate transfer member.

(b) An assisting liquid applying device for applying, to the first intermediate image formed on the intermediate transfer member, an assisting liquid containing thermoplastic resin particles and rosin-based resin particles to form a second intermediate image.

(c) A transfer unit for bringing the second intermediate image formed on the intermediate transfer member into contact with a recording medium, peeling off the second intermediate image from the intermediate transfer member while the contact state with the recording medium is maintained, and transferring the second intermediate image to the recording medium.

The image recording apparatus of the present invention further includes the following temperature control unit configured to improve the adhesiveness between the second intermediate image and the recording medium.

(d) A temperature control unit for controlling the second intermediate image brought into contact with the recording medium to have a temperature Tc not less than Tg of the thermoplastic resin particles contained in the assisting liquid.

The image forming unit for forming a first intermediate image on an intermediate transfer member includes an ink applying unit that applies an ink for forming an image onto an image formation surface of the intermediate transfer member. The image forming unit preferably further includes a liquid applying unit that applies a reaction liquid containing an ink-viscosity-increasing component to the image formation surface of the intermediate transfer member. By at least using the reaction liquid applied with the liquid applying unit and the ink applied with the ink applying unit to form a first intermediate image, the viscosity of the ink can be increased. As the ink applying unit, an ink jet recording apparatus can be used.

In the transfer step, a transfer unit including at least one pair of facing rollers is preferably used from the viewpoint of high speed transfer. A pair of facing rollers are synchronously rotated, and into a nip formed between the rollers, a recording medium is inserted in such a way as to overlap with a second intermediate image held on the intermediate transfer member and is allowed to pass through the nip. At the nip, the second intermediate image is pressed while interposed between the intermediate transfer member and the recording medium. Accordingly, the recording medium presses against the second intermediate image, and the second intermediate image adheres to the recording medium. After passing through the nip, the recording medium is conveyed in the direction for peeling-off from the intermediate transfer member. As a result, the second intermediate image and the intermediate transfer member are peeled off, and the second intermediate image is transferred to the recording medium.

An image recording apparatus and an image recording method pertaining to an embodiment of the present invention will next be described.

Image Recording Apparatus

Figure 1:
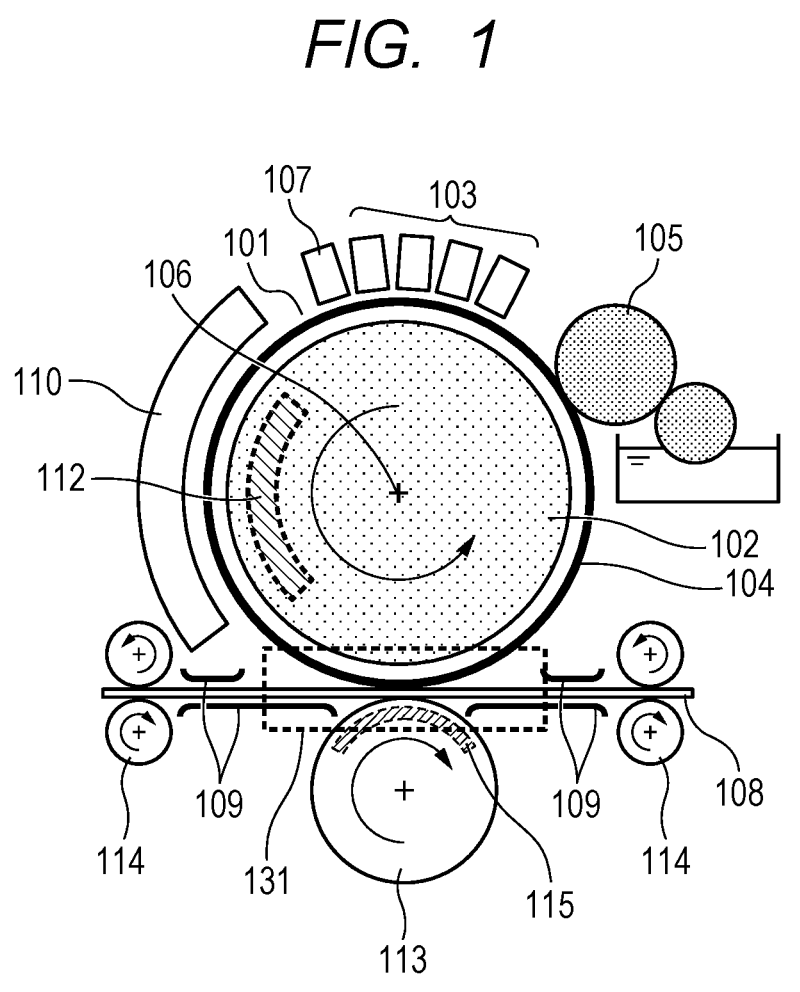

FIG. 1 schematically shows an image recording apparatus pertaining to an embodiment of the present invention.

The image recording apparatus shown in FIG. 1 includes an intermediate transfer member 101 including a rotatable drum-shaped support member 102 and a surface layer member 104 provided on the outer peripheral surface thereof. The support member 102 is rotationally driven in the arrow direction around an axis 106 as the center. Each unit arranged around the member works in such a way as to be synchronized with the rotation thereof.

An image forming unit in the image recording apparatus shown in FIG. 1 includes a roller type applicator 105 as a liquid applying unit for applying a reaction liquid to an image formation region on the outer peripheral surface of the intermediate transfer member 101 and ink jet devices 103 as an ink applying unit for applying an ink. In the roller type applicator 105, a reaction liquid contained in a container for a reaction liquid is carried by the rotation of two rollers on the outer peripheral surface of each roller. Then, by the rotation of the roller in contact with the outer peripheral surface of the intermediate transfer member 101, the reaction liquid is applied from the roller to the outer peripheral surface of the intermediate transfer member 101. The reaction liquid is applied to the intermediate transfer member in such a way as to at least partly overlap with a region of the intermediate transfer member where an ink is to be applied.

At the downstream side from the roller type applicator 105 in the rotation direction of the intermediate transfer member 101, ink jet devices 103 and an ink jet device for an assisting liquid 107 are arranged in such a way as to face to the outer peripheral surface of the intermediate transfer member 101. The ink jet devices 103 constitute the ink applying unit of the ink jet recording apparatus. From the ink jet devices 103, inks containing coloring materials for forming an image are applied to the image formation region on the outer peripheral surface of the intermediate transfer member 101. The ink jet device for an assisting liquid 107 constitutes the assisting liquid applying device. From the ink jet device for an assisting liquid 107, an assisting liquid containing thermoplastic resin particles and rosin-based resin particles is applied to the image formation region on the outer peripheral surface of the intermediate transfer member 101. As the ink jet devices 103 and the ink jet device for an assisting liquid 107, a device including an electrothermal conversion element and ejecting an ink on demand is used. Each ink jet device includes a line-head type ink jet head arranged in a linear manner substantially parallel with the axis 106 of the intermediate transfer member 101.

In this way, a reaction liquid and inks are sequentially applied onto the outer peripheral surface of the intermediate transfer member 101, forming a first intermediate image. To the first intermediate image, an assisting liquid is further applied to form a second intermediate image (a mirror-reversed image) from the reaction liquid, the inks, and the assisting liquid. Around the intermediate transfer member 101, a blower 110 is further provided in order to reduce the liquid content in the second intermediate image formed on the intermediate transfer member 101. By using the blower 110 to reduce the liquid content in the second intermediate image, image degradation at the time of transfer is suppressed, and a good image can be obtained.

In the support member 102 of the intermediate transfer member 101, a heater (first temperature control unit) 112 is provided. The heater 112 can be used to heat the second intermediate image on the intermediate transfer member to a temperature not less than the glass transition temperature of thermoplastic resin particles contained in the assisting liquid before the transfer of the second intermediate image described later. The second intermediate image is not necessarily heated only by the built-in heater shown in the figure, and can also be heated by using an external heater such as an infrared heater. At the further downstream side in the rotation direction of the intermediate transfer member 101, a pressure roller 113 having an outer peripheral surface facing to the outer peripheral surface of the intermediate transfer member 101 is provided. In the image recording apparatus shown in FIG. 1, the intermediate transfer member 101 and the pressure roller 113 constitute a transfer unit and function as a pair of facing rollers, and the pressure roller 113 works as a transfer roller. Into the nip formed between the intermediate transfer member 101 and the pressure roller 113, the second intermediate image on the intermediate transfer member 101 and a recording medium 108 in contact with each other are inserted, and the second intermediate image is brought into pressure contact with the recording medium 108 by the pressure from the pressure roller 113 and is transferred to the recording medium 108. The pressure roller 113 includes a cooling unit (second temperature control unit) 115 therein. With the cooling unit 115, the second intermediate image at the time of peeling-off from the intermediate transfer member 101 can be cooled to a temperature less than the glass transition temperature of thermoplastic resin particles contained in the assisting liquid.

In this way, in the image recording apparatus shown in FIG. 1, the second intermediate image on the intermediate transfer member 101 and the recording medium 108 are interposed and pressed between the intermediate transfer member 101 and the pressure roller 113, and thus the image recording apparatus achieves efficient image transfer. In an actual transfer step, the second intermediate image formed on the intermediate transfer member 101 comes into contact with a recording medium 108 that is conveyed by the rotation of conveyor rollers 114 along conveyor guides 109, in a transfer region 131. The second intermediate image is then peeled off from the intermediate transfer member 101, and the second intermediate image is transferred to the recording medium 108.

In the image recording apparatus of the present embodiment, the second intermediate image in contact with the recording medium 108 is peeled off from the intermediate transfer member 101 while the contact state thereof is maintained. At the time, as the means to control the temperature of the second intermediate image, the cooling unit 115 may be used for cooling. However, the temperature control of the second intermediate image at the time of peeling-off is not limited to this method, and heat radiation from the second intermediate image in the transfer unit may be used for cooling.

Figure 3:
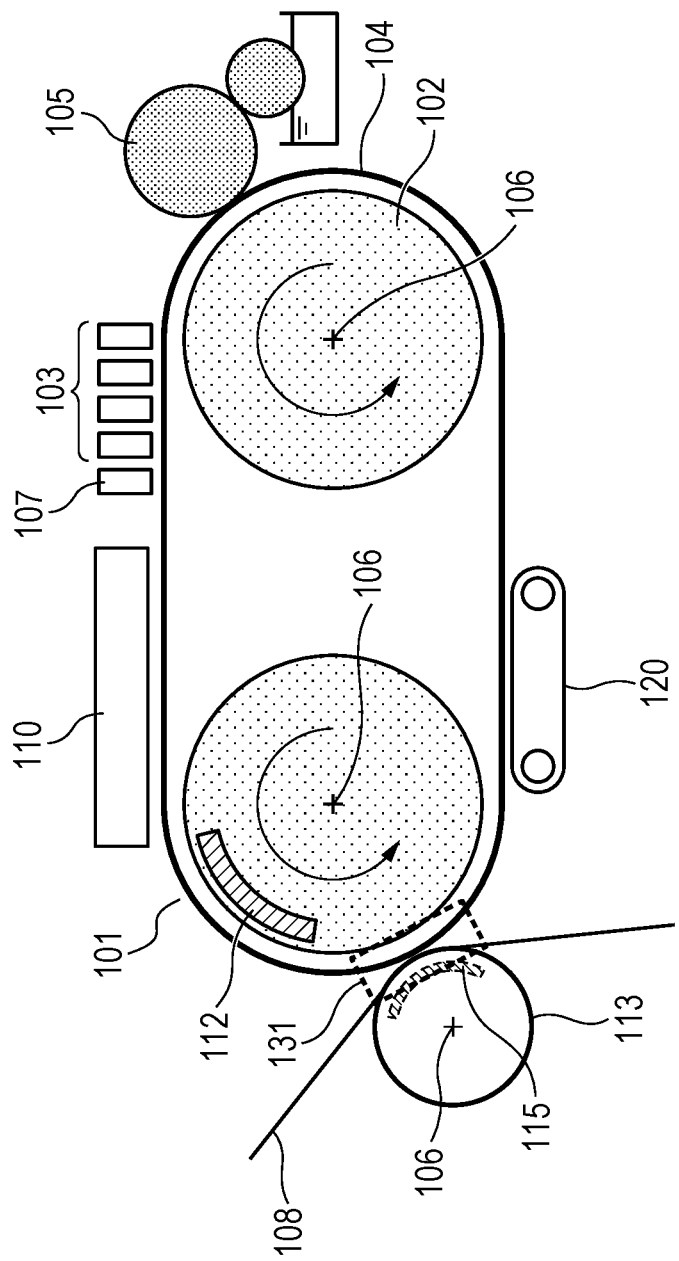
FIG. 3 is a schematic view showing an image recording apparatus pertaining to an embodiment of the present invention.

FIG. 3 and FIG. 4 show other embodiments of the image recording apparatus of the present invention. The image recording apparatus shown in FIG. 3 differs from the image recording apparatus shown in FIG. 1 in including a belt-shaped intermediate transfer member 101 and a conveyor belt (or a fixing belt) 120. The image recording apparatus shown in FIG. 4 differs from the image recording apparatus shown in FIG. 1 in including a belt-shaped intermediate transfer member 101 and a conveyor belt (or a fixing belt) 120 and further including a plurality of pressure rollers 113.

In the image recording apparatuses shown in FIG. 3 and FIG. 4, the intermediate transfer member 101 includes a belt-shaped surface layer member 104 that corresponds to the surface layer member 104 in the image recording apparatus shown in FIG. 1 and is stretched between support members 102, and the belt-shaped member is carried by the rotation of the support members 102. When the conveyor belt 120 is used as a fixing belt, the fixation step described later can be performed by using the fixing belt. The image recording apparatus shown in FIG. 3 and FIG. 4 are the same as the image recording apparatus shown in FIG. 1 except the above structure, and thus the explanation is omitted.

Members constituting the image recording apparatus of the present embodiment will next be described in detail.

Intermediate Transfer Member

The intermediate transfer member is a base material that holds a reaction liquid, an ink, and an assisting liquid to form an intermediate image. The intermediate transfer member includes a support member for handling the intermediate transfer member and for conveying a required force and a surface layer member provided on the support member and for forming an intermediate image. The support member and the surface layer member may be formed from a single member, or may be formed from a plurality of independent members. The size of the intermediate transfer member can be freely selected in accordance with an intended print image size.

Support Member

The shape of the support member is exemplified by a sheet shape, a roller shape, a drum shape, a belt shape, and an endless web shape. When a drum-shaped support member or a belt-shaped endless-web type support member is used, the same intermediate transfer member can be continuously, repeatedly used, and thus such a structure is particularly preferred in terms of productivity.

The support member of the intermediate transfer member is required to have a certain structural strength from the viewpoint of the transfer accuracy and the durability thereof. The material for the support member is exemplified by metals, ceramics, and resins. Specifically, the following materials can be suitably used in terms of the rigidity capable of withstanding the pressure at the time of transfer, dimensional accuracy, and characteristics required to reduce the inertia during operation to improve the control responsivity.

Aluminum, iron, stainless steel, acetal resins, epoxy resins, polyimide, polyethylene, polyethylene terephthalate, nylon, polyurethane, silica ceramics, and alumina ceramics. These materials can be used singly or in combination of two or more of them. When the image recording apparatus shown in FIG. 1 is used, it is preferred to select a support member 102 that allows a second intermediate image to have the above-described temperature history.

Surface Layer Member

The surface layer member of the intermediate transfer member preferably has a certain elasticity in order to bond a second intermediate image with pressure to a recording medium such as paper and to transfer the second intermediate image to the recording medium. When paper is used as the recording medium, the surface layer member preferably has a durometer A hardness of 10° or more to 100° or less and more preferably 20° or more to 60° or less (in accordance with JIS K 6253). As the material of the surface layer member, various materials including polymers, ceramics, and metals can be appropriately used. Specifically, various rubber materials and elastomer materials are preferred from the viewpoint of properties and processing characteristics.

Specifically preferred are polybutadiene rubber, nitrile rubber, chloroprene rubber, silicone rubber, fluororubber, urethane rubber, styrene elastomer, olefin elastomer, polyvinyl chloride elastomer, ester elastomer, and amide elastomer, for example. Polyether, polyester, polystyrene, polycarbonate, siloxane compounds, and perfluorocarbon compounds are also preferred, for example. Of them, nitrile-butadiene rubber, silicone rubber, fluororubber, and urethane rubber are particularly preferably used from the viewpoint of dimensional stability, durability, heat resistance, and the like.

As the surface layer member, a member prepared by laminating a plurality of materials can also be preferably used. For example, a member prepared by covering an endless belt-shaped urethane rubber with silicone rubber, a sheet prepared by laminating silicone rubber on a polyethylene terephthalate (PET) film, and a laminated material prepared by forming a polysiloxane compound film on a urethane rubber sheet can be suitably used. A sheet prepared by infiltrating a rubber material such as nitrile-butadiene rubber and urethane rubber into a woven fabric such as a cotton fabric, a polyester fabric, and a rayon fabric as a base fabric can also be suitably used.

A surface layer member after an appropriate surface treatment may be used. The surface treatment is exemplified by flame treatment, corona treatment, plasma treatment, polishing treatment, roughening treatment, active energy ray (UV, IR, RF, for example) irradiation treatment, ozone treatment, surfactant treatment, and silane coupling treatment. These treatments are also preferably performed in combination. Between the surface layer member and the support member, various adhesives, double-sided adhesive tapes, and the like may be interposed in order to fix and hold these members.

Reaction Liquid

The reaction liquid contains a component that causes ink viscosity increase (hereinafter also called ink-viscosity-increasing component). Here, "causing ink viscosity increase" is the phenomenon including at least one of the cases (i) and (ii).

(i) A coloring material, a resin, or the like as a component constituting an ink comes into contact with an ink-viscosity-increasing component, and is chemically reacted with or physically adsorbed to the component, causing an increase in viscosity of the whole ink.

(ii) A coloring material or the like as a component constituting an ink is aggregated to locally cause viscosity increase.

The ink-viscosity-increasing component can lower the flowability of all or some of the ink on an intermediate transfer member to suppress color unevenness caused by shifting of the ink from a position where the ink is applied onto the intermediate transfer member (hereinafter also called "image shift"). The ink-viscosity-increasing component also has the effect of suppressing bleeding or beading at the time of image formation. The content of the ink-viscosity-increasing component contained in the reaction liquid may be selected in accordance with the type of the ink-viscosity-increasing component, application conditions to an intermediate transfer member, and the type of an ink, for example. In the present embodiment, the content of the ink-viscosity-increasing component in the reaction liquid is preferably 5% by mass or more relative to the total mass of the reaction liquid.

In the present embodiment, conventionally-known materials such as polyvalent metal ions, organic acids, cation polymers, and porous particles can be used as the ink-viscosity-increasing component without any limitation. Specifically preferred are polyvalent metal ions and organic acids. Plural types of ink-viscosity-increasing components are also preferably contained.

Specifically, the polyvalent metal ion usable as the ink-viscosity-increasing component is exemplified by divalent metal ions and trivalent metal ions. Examples of the divalent metal ion include $Ca^{2+}$, $Cu^{2+}$, $Ni^{2+}$, $Mg^{2+}$, $Sr^{2+}$, $Ba^{2+}$, and $Zn^{2+}$, and examples of the trivalent metal ion include $Fe^{3+}$, $Cr^{3+}$, $Y^{3+}$, and $Al^{3+}$.

Examples of the organic acid specifically usable as the ink-viscosity-increasing component include oxalic acid, polyacrylic acid, formic acid, acetic acid, propionic acid, glycolic acid, malonic acid, malic acid, maleic acid, ascorbic acid, levulinic acid, succinic acid, glutaric acid, glutamic acid, fumaric acid, citric acid, tartaric acid, lactic acid, pyrrolidone carboxylic acid, pyrone carboxylic acid, pyrrole carboxylic acid, furan carboxylic acid, pyridine carboxylic acid, coumaric acid, thiophene carboxylic acid, and nicotinic acid.

The reaction liquid can contain a single of or a combination of two or more of these ink-viscosity-increasing components.

The reaction liquid may contain an appropriate amount of water or an organic solvent. The water used in this case is preferably a deionized water prepared by ion exchanging, for example. The organic solvent usable in the reaction liquid is not limited to particular solvents, and any known organic solvent can be used. The organic solvent is specifically exemplified by glycerol, diethylene glycol, polyethylene glycol, and 2-pyrrolidone.

Into the reaction liquid, various resins can be added. The addition of an appropriate resin enables an improvement in the adhesiveness of a second intermediate image to a recording medium at the time of transfer or an increase in the mechanical strength of a final image, and thus is preferred. The resin to be used may be any resin that can coexist with the ink-viscosity-increasing component. To the reaction liquid, a surfactant or a viscosity modifier can be added to appropriately adjust the surface tension or the viscosity thereof, and such a reaction liquid can be used. The material used as the surfactant or the viscosity modifier may be any material that can coexist with the ink-viscosity-increasing component. The surfactant is exemplified by Acetylenol E100 (trade name, manufactured by Kawaken Fine Chemicals).

Ink

Components usable in the ink will next be described.

(a) Coloring Material

The ink can contain at least one of pigments and dyes as the coloring material. The dye and the pigment are not limited to particular materials, can be selected from the materials usable as the coloring material for inks, and can be used in a required amount. The ink is preferably an ink for ink jetting. Specifically, a known dye, carbon black, and an organic pigment can be used as the ink for ink jetting, for example. A coloring material prepared by dissolving and/or dispersing a dye and/or a pigment in a liquid medium can also be used. Specifically, various pigments, which have the characteristics of durability and quality of printed materials, are preferred. The content of the coloring material in the ink is not limited to particular values, and can be appropriately selected within the range capable of forming an intended first intermediate image.

Pigment

The pigment contained in the ink is not limited to particular pigments, and known inorganic pigments and organic pigments can be used. Specifically, pigments indicated by color index (C.I.) numbers can be used. As the black pigment, carbon black is preferably used. The content of the pigment in the ink is preferably 0.5% by mass or more to 15.0% by mass or less and more preferably 1.0% by mass or more to 10.0% by mass or less relative to the total mass of the ink.

Pigment Dispersant

As the dispersant for dispersing a pigment, any dispersant that has been used in known ink jet technology can be used. Specifically, a water-soluble pigment dispersant having both a hydrophilic moiety and a hydrophobic moiety in the molecular structure is preferably used. In particular, a pigment dispersant composed of a resin prepared by copolymerizing a hydrophilic monomer and a hydrophobic monomer is preferably used. The monomers to be copolymerized here are not limited to particular monomers, and conventionally known monomers can be suitably used. Specifically, examples of the hydrophobic monomer include styrene, styrene derivatives, alkyl (meth)acrylates, and benzyl (meth) acrylate. Examples of the hydrophilic monomer include acrylic acid, methacrylic acid, and maleic acid. "(Meth) acrylate" means "acrylate" or "methacrylate" (the same applies hereinafter).

The pigment dispersant preferably has an acid value of 50 mg KOH/g or more to 550 mg KOH/g or less. The pigment dispersant preferably has a weight average molecular weight of 1,000 or more to 50,000 or less. The mass ratio of the pigment and the pigment dispersant is preferably in a range from 1:0.1 to 1:3. What is called a self-dispersible pigment that is dispersible due to surface modification of a pigment itself and eliminates the use of the pigment dispersant in an ink is also preferably used.

(b) Resin Particles

The ink can contain various resin particles having no coloring material. The resin particles are preferably thermoplastic resin particles from the viewpoint of improvement in image quality or fixability. The thermoplastic resin particles may be made from any material, and known resins can be appropriately selected and used. Specifically, the material is exemplified by homopolymers such as polyolefin, polystyrene, polyurethane, polyester, polyether, polyamide, polyvinyl alcohol, polyvinyl chloride, polyvinyl acetate, polyvinylpyrrolidone, poly(meth)acrylic acid and salts thereof, polyalkyl (meth)acrylate, and polydiene; and copolymers prepared by copolymerizing a plurality of such monomers in combination. The resin constituting the thermoplastic resin particles preferably has a weight average molecular weight of 1,000 or more to 2,000,000 or less. The content of the thermoplastic resin particles in the ink is preferably 1% by mass or more to 50% by mass or less and more preferably 2% by mass or more to 40% by mass or less relative to the total mass of the ink.

The resin particles contained in the ink may be the same as or different from the thermoplastic resin particles contained in the assisting liquid, but are preferably thermoplastic resin particles made from the same material as that of the thermoplastic resin particles contained in the assisting liquid from the viewpoint of transferability. To achieve the effect of the invention, the resin particles contained in the ink preferably have a glass transition temperature (Tg) of 0° C. or more to 180° C. or less and more preferably 30° C. or more to 140° C. or less.

In the present embodiment, the resin particles are preferably added as a resin particle dispersion in which the particles are dispersed in a solvent, into the ink. The dispersion technology of resin particles is not limited to particular technologies. Preferred is what is called a self-dispersion type resin particle dispersion in which a resin prepared by homopolymerization of a monomer having a dissociable group or by copolymerization of a plurality of such monomers is dispersed. The dissociable group is exemplified by a carboxyl group, a sulfonic acid group, and a phosphoric acid group, and the monomer having such a dissociable group is exemplified by acrylic acid and methacrylic acid.

In addition, what is called an emulsion-dispersion type resin particle dispersion in which resin particles are dispersed with an emulsifier can be suitably used in the present embodiment. As the emulsifier, any known surfactant having a low molecular weight or a high molecular weight can be suitably used. The surfactant is preferably a nonionic surfactant or a surfactant having the same charge as that of resin particles. The resin particles in the resin particle dispersion preferably have a volume average particle diameter ($D_{50}$) of 10 nm or more to 1,000 nm or less and more preferably 50 nm or more to 500 nm or less. The volume average particle diameter ($D_{50}$) is the value of a volume particle diameter when the cumulative frequency is 50% of the whole in a cumulative distribution function of volume particle diameters. When the resin particle dispersion used in the embodiment is prepared, various additives are preferably added in order to stabilize the dispersion state. As the additive, n-hexadecane, dodecyl methacrylate, stearyl methacrylate, chlorobenzene, dodecyl mercaptan, olive oil, a blue dye (bluing agent: Blue70), and polymethyl methacrylate are preferred, for example.

(c) Surfactant

The ink may contain a surfactant. The surfactant is specifically exemplified by Acetylenol E100 (trade name, manufactured by Kawaken Fine Chemicals). The content of the surfactant in the ink is preferably 0.01% by mass or more to 5.0% by mass or less relative to the total mass of the ink.

(d) Liquid Medium

As the liquid medium in the ink, an aqueous liquid medium including water and a mixture of water and a water-soluble organic solvent can be used. By adding at least one of a dye and a pigment to the aqueous liquid medium, an aqueous ink can be prepared.

The water is preferably a deionized water prepared by ion exchanging, for example. The content of water in the ink is preferably 30% by mass or more to 97% by mass or less relative to the total mass of the ink.

The water-soluble organic solvent is not limited to particular types, and any known organic solvent can be used. The water-soluble organic solvent is specifically exemplified by glycerol, diethylene glycol, polyethylene glycol, and 2-pyrrolidone. The content of the water-soluble organic solvent in the ink is preferably 3% by mass or more to 70% by mass or less relative to the total mass of the ink.

(e) Other Additives

The ink may contain various additives such as a pH adjuster, an anticorrosive, an antiseptic agent, an antifungal agent, an antioxidant, a reduction inhibitor, a water-soluble resin and a neutralizer thereof, and a viscosity modifier, in addition to the above components as needed. As these additives, known additives can be suitably selected and used.

Assisting Liquid

To the first intermediate image formed on the intermediate transfer member, an assisting liquid that is a liquid for assisting transfer and contains thermoplastic resin particles functioning as a binder in the second intermediate image and rosin-based resin particles is applied. By applying the assisting liquid, the adhesiveness between a recording medium and the second intermediate image can be improved, and the abrasion resistance (fixability) of a final image prepared by transferring the second intermediate image can be improved. The assisting liquid may be an aqueous liquid or a non-aqueous liquid.

(a) Thermoplastic Resin Particles

As the thermoplastic resin particles, the thermoplastic resin particles exemplified in the component (b) used in the ink can be used. A single type of thermoplastic resin particles can be used, or two or more types can be used in combination. In order to achieve the effect of the invention, the thermoplastic resin particles preferably have a glass transition temperature (Tg) of 0° C. or more to 180° C. or less and more preferably 30° C. or more to 140° C. or less. The resin constituting the thermoplastic resin particles preferably has a weight average molecular weight of 7000 or more to 2,000,000 or less.

The content of the thermoplastic resin particles in the assisting liquid is preferably 0.5% by mass or more to 20% by mass or less and more preferably 1% by mass or more to 10% by mass or less relative to the total mass of the assisting liquid. When the content of the thermoplastic resin particles is within the range, the effect of preventing the second intermediate image from shifting on the intermediate transfer member due to an ink or the image toughness on a recording medium can be further improved. Moreover, the addition of the thermoplastic resin particles improves the strength of the assisting liquid layer, and thus the transferability is further improved.

The thermoplastic resin particles used in the assisting liquid are preferably added to the assisting liquid as a thermoplastic resin particle dispersion in which particles are dispersed in a solvent as with the resin particles used in the ink. In the thermoplastic resin particle dispersion, the thermoplastic resin particles preferably have a volume average particle diameter ($D_{50}$) of 10 nm or more to 1,000 nm or less and more preferably 50 nm or more to 500 nm or less. Examples of the dispersion technology and various additives for the thermoplastic resin particles include the same technologies and additives exemplified for the resin particles used in the ink.

(b) Rosin-Based Resin Particles

The rosin-based resin constituting the rosin-based resin particles is exemplified by rosins including material rosins such as gum rosin, wood rosin, and tall oil rosin, disproportionated products of the material rosins, stabilized rosins prepared by hydrogenation treatment of the material rosins, and polymerized rosins; and various known rosin derivatives including esterified products of the rosins, phenol-modified products of the rosins, and unsaturated acid-modified rosins. The esterified product of the rosin is an esterified product of the rosin and a polyhydric alcohol. Examples of the polyhydric alcohol include dihydric alcohols such as ethylene glycol, diethylene glycol, propylene glycol, and neopentyl glycol; trihydric alcohols such as glycerol, trimethylolethane, and trimethylolpropane; tetrahydric alcohols such as pentaerythritol and diglycerol; and hexahydric alcohols such as dipentaerythritol. These polyhydric alcohols may be used singly or in combination of two or more of them. Examples of the phenol-modified product of the rosin include addition products of a phenol such as phenol and alkylphenols with the rosin, esterified products of the phenol adduct of a rosin with a polyhydric alcohol, what are called rosin-modified phenol resins prepared by reaction of the rosin with a resol type phenol resin, and esterified products thereof. Examples of the unsaturated acid-modified rosin include modified products of the rosin with an unsaturated acid such as maleic acid, fumaric acid, and (meth)acrylic acid, and esterified products thereof. Examples of the esterified product of an unsaturated acid-modified rosin are products of esterification of the unsaturated acid-modified rosin with the polyhydric alcohol. These rosin-based resins may be used singly or in combination of two or more of them. The rosin-based resin constituting the rosin-based resin particles preferably has a weight average molecular weight of 300 or more to 5000 or less.

The rosin-based resin particles are preferably used in the form of a rosin-based resin particle dispersion in which the rosin-based resin particles are dispersed in a liquid to prepare the assisting liquid. The rosin-based resin particles are preferably prepared by dispersing the rosin-based resin particles with an emulsifier. The emulsifier is not limited to particular emulsifiers, and a known emulsifier can be used, for example. The type of the emulsifier is preferably selected in consideration of the dispersion stability of the rosin-based resin particles in the assisting liquid.

The emulsifier can be a low molecular compound or a polymer compound as long as the compound has an emulsification capacity. Specific examples of the emulsifier include anionic emulsifiers such as carboxylates, sulfonates, and salts of sulfuric acid ester, and nonionic emulsifiers having a polyoxyethylene alkyl ether. An exemplified pigment dispersant used in the ink can be used as the emulsifier to disperse the rosin-based resin particles. The emulsifiers can be used singly or in combination of two or more of them. In the rosin-based resin particles, the mass ratio of the rosin-based resin and the emulsifier (content of rosin-based resin:content of emulsifier) is preferably in a range from 1:1 to 20:1.

In order to prevent printed products from adhering to each other at room temperature, one or both of the glass transition temperature or melting point of the rosin-based resin constituting the rosin-based resin particles and the glass transition temperature or melting point of the emulsifier are preferably 30° C. or more.

The rosin-based resin constituting the rosin-based resin particles preferably has a low acid value in order to increase the hydrophobic interaction to a recording medium. Specifically, the rosin-based resin preferably has an acid value of 50 mg KOH/g or less and more preferably 25 mg KOH/g or less.

The rosin-based resin particles preferably have a volume average particle diameter ($D_{50}$) of 10 nm or more to 1,000 nm or less and more preferably 50 nm or more to 500 nm or less.

The content of the rosin-based resin particles is preferably 0.1% by mass or more to 10% by mass or less and more preferably 0.5% by mass or more to 5% by mass or less relative to the total mass of the assisting liquid. In the assisting liquid, the mass ratio of the thermoplastic resin particles and the rosin-based resin particles (content of thermoplastic resin particles:content of rosin-based resin particles) is preferably in a range from 20:1 to 1:2 and more preferably in a range from 10:1 to 1:1. When the mass ratio of the thermoplastic resin particles and the rosin-based resin particles is within the range, the strength of the assisting liquid layer formed by addition of the thermoplastic resin particles is maintained, as well as good transferability can be achieved.

(c) Water-Soluble Resin

The assisting liquid can contain a water-soluble resin. The water-soluble resin used in the assisting liquid may be any type, but the type of the water-soluble resin is preferably changed in accordance with the type of the assisting liquid applying device. For example, when the assisting liquid applying device is an ink jet device, a water-soluble resin having a weight average molecular weight of 2,000 or more to 20,000 or less is preferably used, and a water-soluble resin having a weight average molecular weight of 5,000 or more to 10,000 or less is more preferably used. When the assisting liquid applying device is a roller application unit, a water-soluble resin having a higher weight average molecular weight can also be used. The water-soluble resin preferably has a glass transition temperature of 30° C. or more to 150° C. or less.

Such a water-soluble resin is specifically exemplified by block copolymers, random copolymers, and graft copolymers of at least two or more monomers (at least one of them is a hydrophilic polymerizable monomer) selected from styrene, styrene derivatives, vinylnaphthalene, vinylnaphthalene derivatives, aliphatic alcohol esters of α,β-ethylenically unsaturated carboxylic acids, acrylic acid, acrylic acid derivatives, maleic acid, maleic acid derivatives, itaconic acid, itaconic acid derivatives, fumaric acid, fumaric acid derivatives, vinyl acetate, vinyl alcohol, vinylpyrrolidone, acrylamide, and derivatives thereof; and salts thereof. Natural resins such as rosin, shellac, and starch are also preferred. These water-soluble resins are preferably alkali-soluble resins that are soluble in an aqueous solution in which a base is dissolved. The water-soluble resin more preferably has a hydrophobic moiety. The hydrophobic moiety is not limited to particular moieties, but is preferably a functional group having an unsaturated bond, such as a styrene group. These water-soluble resins may be used singly or in combination of two or more of them.

(d) Liquid Medium

The liquid medium used in the assisting liquid is not limited to particular media, and an aqueous liquid medium including water and a mixture of water and a water-soluble organic solvent can be used. The water is preferably a deionized water prepared by ion exchanging, for example. The content of water in the assisting liquid is preferably 30% by mass or more to 97% by mass or less relative to the total mass of the assisting liquid. As the liquid medium used in a non-aqueous assisting liquid, a known water-soluble organic solvent can be used, and the water-soluble organic solvent is specifically exemplified by methanol, ethanol, glycerol, diethylene glycol, polyethylene glycol, and 2-pyrrolidone. The content of the water-soluble organic solvent in the assisting liquid is preferably 10% by mass or more to 97% by mass or less relative to the total mass of the assisting liquid.

(e) Other Additives

The assisting liquid may contain, in addition to the above components, various additives such as a surfactant used in an ink, a pH adjuster, an anticorrosive, an antiseptic agent, an antifungal agent, an antioxidant, a reduction inhibitor, a neutralizer of the water-soluble resin, and a viscosity modifier.

Compound Forming Hydrogen Bond with Anionic Group

When the above materials forming the second intermediate image contain an anionic group, a compound forming a hydrogen bond with the anionic group is preferably added to the ink and/or the assisting liquid in order to allow the ink and/or the assisting liquid to aggregate at high speed on the intermediate transfer member. The material containing the anionic group is exemplified by a material having an anionic group such as a carboxylic acid group for imparting solubility or dispersibility to thermoplastic resin particles and/or rosin-based resin particles.

An assisting liquid in an aggregate state can effectively suppress image quality degradation such as image displacement at the time of transfer even when the second intermediate image is insufficiently dried. In addition, the binding strength among aggregates increases in the second intermediate image, and the transferability is improved. Use of a compound capable of forming a hydrogen bond can suppress image shift in which an ink aggregates on the intermediate transfer member to cause volumetric shrinkage, and thus an image shifts from an intended position. The compound forming a hydrogen bond with an anionic group used for such a purpose is exemplified by a block copolymer containing an ethylene oxide unit and a propylene oxide unit and a compound containing a block copolymer containing an ethylene oxide unit and a propylene oxide unit. A combination of two or more of them can also be used. The compound forming a hydrogen bond with an anionic group is specifically exemplified by surfactants represented by General Formula (1) or (2). The surfactant is a block copolymer including an ethylene oxide unit and a propylene oxide unit

[Chemical Formula 1]

General Formula (1)

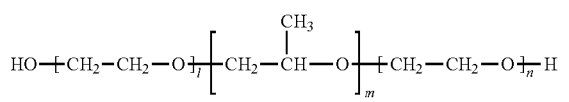

General Formula (2)

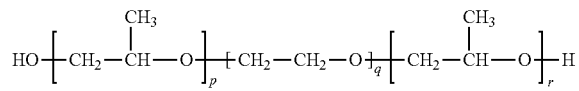

In General Formula (1), 1+n is a real number of 3 or more to 45 or less, and m is a real number of 16 or more to 57 or less.

In General Formula (2), p+r is a real number of 25 or more to 50 or less, and q is a real number of 8 or more to 25 or less.

Each of l, n, p, and r is independently a real number within the above range.

Specifically, a surfactant having a structure represented by General Formula (1) is more preferably used, and a surfactant having a structure represented by General Formula (1) in which l+n is a real number of 3 or more to 15 or less, and m is a real number of 16 or more to 31 or less is even more preferably used.

The ink and/or the assisting liquid can contain a surfactant having at least one structure selected from the structures represented by General Formulae (1) and (2). The content of the at least one surfactant is preferably 0.2% by mass or more to 5% by mass or less and more preferably 1% by mass or more to 4% by mass or less relative to the total mass of the ink or the assisting liquid.

When the ink and the assisting liquid contain the thermoplastic resin particles, the blending rate of the thermoplastic resin particles contained in the ink or the assisting liquid relative to the at least one surfactant is preferably 1 or more to 10 or less and more preferably 1.5 or more to 5.0 or less in terms of mass. The blending rate of the thermoplastic resin particles to the surfactant can be calculated in accordance with the following equation.

Blending rate of thermoplastic resin particles to surfactant in ink (or assisting liquid)=(content of thermoplastic resin particles contained in ink (or assisting liquid))/(content of surfactant having at least one structure selected from structures represented by General Formulae (1) and (2) contained in ink (or assisting liquid)).

The surfactant having the structure represented by General Formula (1) is exemplified by Pluronic L-31, Pluronic L-34, Pluronic L-61, Pluronic P-84, Pluronic P-103, Pluronic L-101, and Pluronic P-85 (each being a trade name) manufactured by ADEKA Corporation.

As the compound forming a hydrogen bond with an anionic group, a polyhydric alcohol having a polyalkyleneoxy chain can also be used. The polyhydric alcohol having a polyalkyleneoxy chain can be synthesized from a polyhydric alcohol as a starting material by adding an alkyleneoxy group. The polyhydric alcohol having a polyalkyleneoxy chain has a structure in which the hydrogen atom of a hydroxyl group of a polyhydric alcohol as the starting material is substituted by "—$(R)_s$—H". R in —$(R)_s$—H represents an alkyleneoxy group, and s represents the repetition number of R. When s is 2 or more, a plurality of Rs (or R's) may be the same as or different from each other.

The polyhydric alcohol usable as the starting material is preferably an alcohol having 3 or more carbon atoms and 3 or more hydroxyl groups (i.e., trihydric or higher alcohol). Specific examples of the polyhydric alcohol include sorbitol, maltitol, xylitol, erythritol, lactitol, mannitol, glycerol, diglycerol, polyglycerol, oligosaccharide alcohol, palatinit, threitol, arabinitol, ribitol, iditol, volemitol, perseitol, octitol, galactitol, trimethylolpropane, trimethylolethane, dimethylol heptane, glucose, glucosides, and condensation products of such polyhydric alcohols. The condensation product of a polyhydric alcohol is exemplified by dipentaerythritol. Of them, preferred are sorbitol, xylitol, erythritol, dipentaerythritol, mannitol, glycerol, diglycerol, polyglycerol, trimethylolethane, and condensation products thereof.

The number of Rs per molecule of the polyhydric alcohol having a polyalkyleneoxy chain (s) is preferably 40 or more to 120 or less when the polyhydric alcohol is trihydric, and is preferably 12 or more to 400 or less for tetrahydric alcohols. The number of Rs per molecule is more preferably 50 or more to 120 or less when the polyhydric alcohol is tetrahydric, and is more preferably 40 or more to 400 or less for pentahydric to dodecahydric alcohols. "The number of Rs per molecule" means the repetition number of alkyleneoxy units contained in one molecule of a polyhydric alcohol having a polyalkyleneoxy chain.

The alkyleneoxy group shown by R in the structure represented by —$(R)_s$—H is exemplified by an alkyleneoxy group having a linear alkylene group with 1 to 3 carbon atoms, such as a methyleneoxy group, an ethyleneoxy group, and a propyleneoxy group.

The group represented by —$(R)_s$—H is preferably a polyalkyleneoxy group containing a polyethyleneoxy chain [—$(CH_2CH_2O)_x$—]. In the structure, x represents the repetition number of ethyleneoxy units.

R may be a combination of a plurality of alkyleneoxy groups. For example, a structure containing both an ethyleneoxy unit and a propyleneoxy unit and having a total repetition number of the units of s is also included in the structure represented by —$(R)_s$—H. The structure represented by —$(R)_s$—H may be a random copolymer or a block copolymer containing an ethyleneoxy unit and another alkyleneoxy unit. In such a case, the proportion of the ethyleneoxy unit is preferably 5% by mass or more in the whole structure represented by —$(R)_s$—H from the viewpoint of water-solubility.

The polyhydric alcohol having a polyalkyleneoxy chain is preferably a block copolymer containing an ethyleneoxy unit and a propyleneoxy unit. Specifically preferred are [—$(CH_2CH_2O)_x$—$(CHCH_3CH_2O)_y$—H] and [—$(CHCH_3CH_2O)_y$—$(CH_2CH_2O)_x$—H] in terms of interaction with a coloring material or with thermoplastic resin particles. In the structure, x and y represent the repetition numbers of the corresponding units.

As the compound forming a hydrogen bond with an anionic group, polyvinyl alcohol, a polyvinyl alcohol copolymer, polyvinylpyrrolidone, and a polyvinylpyrrolidone copolymer can also be used.

The various compounds described above may be used singly or in combination of two or more of them.

Recording Medium

The recording medium may be any printing paper including coated papers and matte papers. The recording medium may be a sheet cut into a predetermined shape, a long sheet, or a rolled sheet.

Image Recording Method

In the image recording method of the present embodiment, a reaction liquid is optionally applied onto an intermediate transfer member, and then an ink is applied onto the intermediate transfer member or the reaction liquid to form a first intermediate image on the intermediate transfer member. To the first intermediate image on the intermediate transfer member, an assisting liquid is next applied to form a second intermediate image. The second intermediate image is next heated to a temperature Tc not less than the glass transition temperature (Tg) of thermoplastic resin particles contained in an assisting liquid, then is brought into contact with a recording medium, and is transferred to the recording medium.

When the heated second intermediate image comes in contact with the recording medium, the flowability of the thermoplastic resin particles in the second intermediate image increases, and the adhesiveness between the recording medium and the second intermediate image is improved. Some or all of the thermoplastic resin particles are fused, and thus the strength of the second intermediate image increases. At the time, a second intermediate image containing both the thermoplastic resin particles and rosin-based resin particles can be in firm contact with the recording medium due to softening and flowing of the thermoplastic resin particles. On this account, a strong hydrophobic interaction is expressed between the rosin-based resin particles and the recording medium, and interfacial peeling between the second intermediate image and the recording medium is unlikely to be caused. As a result, the transfer efficiency of the second intermediate image to the recording medium is improved, and high-quality images can be stably produced. When the temperature Tc of the second intermediate image is not less than the glass transition temperature of the rosin-based resins, the rosin-based resin particles also soften and flow, and thus the adhesiveness between the recording medium and the second intermediate image is further improved to achieve higher transfer efficiency. Such a condition is thus preferred.

When an intermediate transfer member is heated in order to adjust a second intermediate image to an intended temperature, it requires a certain time from the occurrence of heat conduction from the intermediate transfer member to the second intermediate image until the second intermediate image reaches an intended temperature. In the present embodiment, the intermediate transfer member is heated before the transfer step, and thus the temperature of the second intermediate image can be adjusted to an intended temperature when the recording medium comes into contact with the second intermediate image in the transfer step. In addition, the second intermediate image is an extremely thin film image, and thus on contact with the recording medium, heat conduction occurs from the second intermediate image to the recording medium side for an extremely short period of time. At the time of heat conduction, the temperature of the recording medium is also unlikely to increase, and thus it is supposed that the temperature when the second intermediate image is peeled off from the intermediate transfer member is less than the glass transition temperature of the thermoplastic resin particles contained in the assisting liquid. In the present embodiment, it is supposed that the heat conduction speed in the second intermediate image, which is extremely thin, does not limit the temperature change of the second intermediate image. Hence, there is no need to consider a temperature gradient in the second intermediate image caused by time periods for the heat conduction from the intermediate transfer member to the second intermediate image and the heat conduction from the second intermediate image to the recording medium at the time of transfer.

In the embodiment, the temperature of the second intermediate image brought into contact with the recording medium at the time of transfer can be determined by measuring the surface temperature of the second intermediate image on the intermediate transfer member before transfer, by an infrared thermometer. Based on the temperature determined in this manner, the temperature control of the second intermediate image can be performed. When a heater 112 is used to heat the second intermediate image as in the embodiment, the temperature on the image surface can be considered to be the temperature of the second intermediate image because the second intermediate image on the intermediate transfer member is an extremely thin film image. In this case, the temperature of the intermediate transfer member can be considered to be the same as the temperature of the second intermediate image on the intermediate transfer member. In the image recording apparatus shown in FIG. 1, the temperature of the intermediate transfer member before the formation of the nip with the pressure roller 113 and the surface temperature of the recording medium after passing through the nip are measured, and the temperature control can also be performed on the basis of the results.

The temperature control of the second intermediate image can also be performed by the following procedure.

The change in temperature of the intermediate transfer member surface in the conveyance period of time from the heating by the heater 112 in the image recording apparatus shown in FIG. 1 until the start of pressing by the pressure roller 113 or until the surface reaches the entrance of the nip is previously estimated on the basis of theoretical values or the result of pilot studies. The change in temperature of the intermediate transfer member surface when the pressure roller 113 is in a pressure contact state with the intermediate transfer member surface through the recording medium 108 is previously estimated on the basis of theoretical values or the result of pilot studies. Members and operation conditions of the image recording apparatus shown in FIG. 1 are selected in such a way that a temperature history based on these estimated values of the temperature change achieves an intended temperature. In this manner, the temperature at the time of transfer can also be controlled at an intended value.

When an external heater such as an infrared heater is used for heating, the intermediate transfer member and the second intermediate image may have a slight difference in temperature due to a difference in infrared absorbance therebetween, for example. In this case, assumed maximum amounts of an ink and an assisting liquid are applied to form a second intermediate image, then the temperatures on the intermediate transfer member and the second intermediate image are previously measured, and on the basis of the results, the temperature control can be performed so as to achieve an intended temperature. When there is a time period without heating from the heating until the start of pressing with the pressure roller 113, the temperature at the pressure roller may be lower than the temperatures of the intermediate transfer member and the second intermediate image measured with an infrared thermometer before transfer, due to heat radiation. In this case, infrared thermometers are provided at plural positions from immediately after heating to immediately before transfer, and the change in temperature of the intermediate transfer member surface is previously estimated on the basis of theoretical values or the result of pilot studies. Based on the estimate, the temperature of the second intermediate image can be determined.

Each step of the image recording method of the present embodiment will next be described in detail.

Reaction Liquid Application Step

The image recording method of the present embodiment preferably includes a step of applying a reaction liquid onto an image formation surface of an intermediate transfer member before a step of applying an ink onto the image formation surface of the intermediate transfer member. As the method of applying the reaction liquid onto the image formation surface of the intermediate transfer member, various known technologies can be appropriately selected and used. The technology is specifically exemplified by die coating, blade coating, technologies using gravure rollers, technologies using offset rollers, and spray coating. The method of using an ink jet device to apply the reaction liquid is also preferred. A combination of a plurality of the above methods is also preferred.

Ink Application Step

Subsequently, onto the image formation surface of the intermediate transfer member optionally with the reaction liquid, an ink is applied to form a first intermediate image. The method of applying the ink is not limited to particular methods, and an ink jet device is preferably used to apply the ink. The ink jet device used in the embodiment is exemplified by the following systems.

- A system that causes film boiling of an ink by an electrothermal converter to form bubbles and discharges the ink.
- A system that discharges an ink by an electromechanical converter.
- A system that discharges an ink by using static electricity.

In addition to the above systems, any of various ink jet devices used in the ink jet liquid discharge technology are also be used. Specifically, the system using an electrothermal converter can be suitably used in terms of enabling high-density printing at high speed.

The whole shape of the ink jet device is not limited to particular shapes. For example, what is called a shuttle type ink jet head in which a head is swept in a direction orthogonal to the moving direction of an intermediate transfer member for recording can be used. In addition, what is called a line-head type ink jet head in which ink ejection orifices are arranged in a linear manner substantially orthogonal to the moving direction of an intermediate transfer member (i.e., substantially parallel with the axis direction for a drum-shaped intermediate transfer member) can also be used.

The ink may have any characteristics as long as the effect of the invention is not impaired, and preferably has a surface tension of 20 mN/m or more to 50 mN/m or less.

Assisting Liquid Application Step

Next, to the first intermediate image formed on the image formation surface of the intermediate transfer member, an assisting liquid is applied. The method of applying the assisting liquid is not limited to particular methods, and an ink jet device is preferably used as with the application of the ink. Through the step, a second intermediate image is formed on the intermediate transfer member.

The assisting liquid may have any characteristics as long as the effect of the invention is not impaired, and preferably has a surface tension of 20 mN/m or more to 50 mN/m or less. The surface tension of the assisting liquid is preferably lower than the surface tension of the ink. When having a surface tension lower than the surface tension of the ink, the assisting liquid easily spreads on the intermediate transfer member, and the accessibility to an ink can be improved.

Liquid Content Removal Step

In the present embodiment, a step of reducing a liquid content from the first intermediate image and/or the second intermediate image formed on the intermediate transfer member is preferably provided. Through the liquid content removal step, an excess liquid content in the first intermediate image and/or the second intermediate image is removed. Accordingly, an excess liquid content is prevented from extruding in the transfer step, and a good final image can be obtained. As the liquid removal technology, any of various technologies commonly used can be suitably used. Examples of the technology include a heating method, a method of blowing low-humidity air, a decompression method, a method of bringing an absorber into contact, and a combination method of them. The liquid content can also be removed by air drying. When the liquid content is removed by heating, the intermediate transfer member is heated by the heating, and consequently the intermediate transfer member and the second intermediate image may have a temperature not less than Tg of the thermoplastic resin particles. In such a case, the heater for removing a liquid content also serves as the temperature control unit for the second intermediate image.

Transfer Step

In the transfer step, the second intermediate image is heated in such a way that the second intermediate image brought into contact with the recording medium has a temperature not less than the glass transition temperature of the thermoplastic resin particles. The temperature Tc of the second intermediate image brought into contact with the recording medium is not limited to particular values as long as "Tc glass transition temperature of thermoplastic resin particles" is satisfied, and is preferably 50° C. or more to 140° C. or less.

The temperature of the intermediate transfer member at the time of transfer is preferably 30° C. or more to 180° C. or less and more preferably 50° C. or more to 140° C. or less in order to prevent deformation of a recording medium by heating. The conveyance speed of a recording medium when the second intermediate image is transferred to the recording medium is preferably 0.1 m/s or more to 3 m/s or less. The nip pressure between the pressure roller and the intermediate transfer member at the time of transfer is preferably 1 kg/cm$^2$ or more to 30 kg/cm$^2$ or less and more preferably 2 kg/cm$^2$ or more to 15 kg/cm$^2$ or less.

Fixation Step

As an additional step, a fixation step may be provided to press the recording medium on which an image has been recorded after transfer with a roller in order to improve the fixability of the final image to the recording medium. It is also preferred to heat the recording medium because the fixability of the final image may be further improved. A heat roller may be used to simultaneously perform pressurization and heating.

Liquid Set

From the above-described ink and the assisting liquid as a liquid for assisting transfer, a liquid set of the present invention can be formed. The liquid set may further include such a reaction liquid as described above, as needed. The liquid set can be suitably used for the image recording method of the present invention, or for transfer-type image recording.

The present invention can provide an image recording method enabling an improvement of the transfer efficiency of a second intermediate image to a recording medium by the application of an assisting liquid to a first intermediate image and enabling stable recording of an image having an intended image quality on a recording medium and provide a transfer assisting liquid and a liquid set for transfer-type image recording.

EXAMPLES

The present invention will next be described in further detail with reference to examples. The present invention is not intended to be limited by the following examples without departing from the scope of the invention. In the description, "part" and "%" are based on mass unless otherwise noted. Reaction liquids, an ink, and assisting liquids used for image recording were first prepared.

Preparation of Reaction Liquid

Preparation of Reaction Liquid 1

First, 30 parts of malic acid, 7 parts of glycerol, parts of a surfactant (trade name: Acetylenol E100, manufactured by Kawaken Fine Chemicals), and 58 parts of ion-exchanged water were mixed and thoroughly stirred, and the mixture was subjected to pressure filtration through a microfilter with a pore size of 3.0 μm (manufactured by Fujifilm Corporation), giving a reaction liquid 1.

Preparation of Reaction Liquid 2

The same procedure as for the reaction liquid 1 was performed with the exception that calcium chloride was used in place of malic acid, giving a reaction liquid 2.

Preparation of Pigment

Preparation of Black Pigment Dispersion

The following components were mixed and placed in a batch type vertical sand mill (manufactured by Aimex).

- Carbon black (trade name: Monarch 1100, manufactured by Cabot): 10 parts
- Aqueous resin solution (prepared by neutralizing an aqueous solution of a styrene-ethyl acrylate-acrylic acid copolymer having an acid value of 150 mg KOH/g and a weight average molecular weight of 8,000, at a resin content of 20.0% by mass with an aqueous potassium hydroxide solution): 15 parts
- Pure water: 75 parts Into the sand mill, 200 parts of 0.3-mm zirconia beads were next placed, and the mixture was dispersed for 5 hours while cooled with water. The dispersion liquid was centrifuged to remove coarse particles, giving a black pigment dispersion having a pigment content of 10.0% by mass.

Preparation of Thermoplastic Resin Particle Dispersion

Preparation of Thermoplastic Resin Particle Dispersion 1

To a mixed solution of 74 parts of ion-exchanged water and 0.2 part of potassium persulfate, an emulsion prepared by mixing 24 parts of butyl methacrylate, 1.5 parts of methacrylic acid, and 0.3 part of Aqualon KH-05 (trade name, manufactured by Dai-ichi Kogyo Seiyaku Co., Ltd.) was added dropwise over 1 hour under a nitrogen atmosphere at 80° C. with stirring and polymerized, and the mixture was further stirred for 2 hours. The reaction mixture was cooled to room temperature, and then ion-exchanged water and an aqueous potassium hydroxide solution were added, giving an anionic thermoplastic resin particle dispersion 1 having a resin content of 25% by mass and a pH of 8.5. The resin particles in the obtained dispersion had a volume average particle diameter ($D_{50}$) of 220 nm and a Tg of 30° C. The glass transition temperatures (Tg) of the thermoplastic resin particles and the rosin-based resin described later and the volume average particle diameters ($D_{50}$) of the thermoplastic resin particles and the rosin-based resin particles described later were measured by the following procedure.

Measurement of Glass Transition Temperature

As for the glass transition temperature of thermoplastic resin particles, a thermoplastic resin particle dispersion was dried and solidified at 25° C., and the resulting sample was subjected to measurement with a differential scanning calorimeter DSC-Q1000 (trade name, TA Instruments). The glass transition temperature was determined by performing a temperature cycle from −70° C. to 180° C. (temperature increase rate: 10° C./min) twice. The glass transition temperature of a rosin-based resin was determined in the same manner as for the thermoplastic resin particles with the exception that a rosin-based resin used to prepare a rosin-based resin particle dispersion was used as the sample.

Measurement of Volume Average Particle Diameter ($D_{50}$)

The volume average particle diameters ($D_{50}$) of thermoplastic resin particles and rosin-based resin particles were determined by the following procedure. A resin particle dispersion was diluted 50 times (in terms of volume) with pure water, and the diluted dispersion was subjected to measurement with an UPA-EX150 (manufactured by Nikkiso Co., Ltd.) in measurement conditions of a SetZero of 65 seconds, a number of measurements of three times, a measurement time of 180 seconds, and a refractive index of 1.5.

Preparation of Thermoplastic Resin Particle Dispersion 2

The same procedure as for the thermoplastic resin particle dispersion 1 was performed with the exception that ethyl methacrylate was used in place of butyl methacrylate, giving an anionic thermoplastic resin particle dispersion 2 having a resin content of 25% by mass and a pH of 8.5. The resin particles in the obtained dispersion had a volume average particle diameter ($D_{50}$) of 210 nm and a Tg of 60° C.

Preparation of Thermoplastic Resin Particle Dispersion 3

The same procedure as for the thermoplastic resin particle dispersion 1 was performed with the exception that methyl methacrylate was used in place of butyl methacrylate, giving an anionic thermoplastic resin particle dispersion 3 having a resin content of 25% by mass and a pH of 8.5. The resin particles in the obtained dispersion had a volume average particle diameter ($D_{50}$) of 230 nm and a Tg of 100° C.

Preparation of Thermoplastic Resin Particle Dispersion 4

SUMIKAFLEX 752 (trade name, manufactured by Sumitomo Chemical Co., Ltd.) as ethylene-vinyl acetate copolymer resin particles were diluted with ion-exchanged water, giving a thermoplastic resin particle dispersion 4 having a nonvolatile content of 25.0% by mass. The resin particles in the obtained dispersion had a volume average particle diameter ($D_{50}$) of 475 nm and a Tg of 15° C.

Preparation of Thermoplastic Resin Particle Dispersion 5

L-2301 (trade name, manufactured by Asahi Kasei Corporation) as styrene-butadiene copolymer resin particles was diluted with ion-exchanged water, giving a thermoplastic resin particle dispersion 5 having a nonvolatile content of 25.0% by mass. The resin particles in the obtained dispersion had a volume average particle diameter ($D_{50}$) of 160 nm and a Tg of 24° C.

Preparation of Thermoplastic Resin Particle Dispersion 6

KA-6137S (trade name, manufactured by Unitika Ltd.) as polyester resin particles was diluted with ion-exchanged water, giving a thermoplastic resin particle dispersion 6 having a nonvolatile content of 25.0% by mass. The resin particles in the obtained dispersion had a volume average particle diameter ($D_{50}$) of 54 nm and a Tg of 43° C.

Preparation of Thermoplastic Resin Particle Dispersion 7

SF820 (trade name, manufactured by Dai-ichi Kogyo Seiyaku Co., Ltd.) as urethane resin particles was diluted with ion-exchanged water, giving a thermoplastic resin particle dispersion 7 having a nonvolatile content of 25.0% by mass. The resin particles in the obtained dispersion had a volume average particle diameter ($D_{50}$) of 30 nm and a Tg of 46° C.

Preparation of Rosin-Based Resin Particle Dispersion

Preparation of Rosin-Based Resin Particle Dispersion 1

To 70 parts of ion-exchanged water, 22.5 parts of a rosin ester resin, Ester gum AT (trade name, Tg: −24° C., acid value: 5 mg KOH/g, manufactured by Arakawa Chemical Industries, Ltd.) and 2.5 parts of an emulsifier, sodium stearate (manufactured by Wako Pure Chemical Industries, Ltd.) were added, and then the solution was heated at 90° C. and was sonicated with a sonicator for 1 hour while temperature control was performed to maintain the temperature. Subsequently, the obtained dispersion liquid was quickly cooled, giving a rosin-based resin particle dispersion 1 having an added nonvolatile content of 25% by mass. The rosin-based resin particles in the dispersion had a volume average particle diameter ($D_{50}$) of 250 nm. The acid value of the rosin-based resin was determined in accordance with JIS method (JIS K 0070).

Preparation of Rosin-Based Resin Particle Dispersion 2

The same procedure as for the rosin-based resin particle dispersion 1 was performed with the exception that sodium dodecylsulfonate (manufactured by Wako Pure Chemical Industries, Ltd.) was used as the emulsifier, giving a rosin-based resin particle dispersion 2 having an added nonvolatile content of 25% by mass. The rosin-based resin particles in the dispersion had a volume average particle diameter ($D_{50}$) of 200 nm.

Preparation of Rosin-Based Resin Particle Dispersion 3

The same procedure as for the rosin-based resin particle dispersion 1 was performed with the exception that parts of 4.5% aqueous solution of a sodium salt of styrene-butyl acrylate-acrylic acid copolymer (acid value: 130 mg KOH/g, weight average molecular weight: 7,000) was used in place of sodium stearate and ion-exchanged water, giving a rosin-based resin particle dispersion 3 having an added nonvolatile content of 25% by mass. The rosin-based resin particles in the dispersion had a volume average particle diameter ($D_{50}$) of 300 nm.

Preparation of Rosin-Based Resin Particle Dispersion 4

The same procedure as for the rosin-based resin particle dispersion 1 was performed with the exception that SUPER ESTER L (trade name, Tg: −37° C., acid value: 12 mg KOH/g, manufactured by Arakawa Chemical Industries, Ltd.) was used as the rosin ester resin, giving a rosin-based resin particle dispersion 4 having an added nonvolatile content of 25% by mass. The rosin-based resin particles in the dispersion had a volume average particle diameter ($D_{50}$) of 240 nm.

Preparation of Rosin-Based Resin Particle Dispersion 5

The same procedure as for the rosin-based resin particle dispersion 1 was performed with the exception that SUPER ESTER A-18 (trade name, Tg: −21° C., acid value: 21 mg KOH/g, manufactured by Arakawa Chemical Industries, Ltd.) was used as the rosin ester resin, giving a rosin-based resin particle dispersion 5 having an added nonvolatile content of 25% by mass. The rosin-based resin particles in the dispersion had a volume average particle diameter ($D_{50}$) of 255 nm.

Preparation of Rosin-Based Resin Particle Dispersion 6

The same procedure as for the rosin-based resin particle dispersion 1 was performed with the exception that KE-364C (trade name, Tg: −12° C., acid value: 36 mg KOH/g, manufactured by Arakawa Chemical Industries, Ltd.) was used as the rosin ester resin, giving a rosin-based resin particle dispersion 6 having an added nonvolatile content of 25% by mass. The rosin-based resin particles in the dispersion had a volume average particle diameter ($D_{50}$) of 255 nm.

Preparation of Rosin-Based Resin Particle Dispersion 7

The same procedure as for the rosin-based resin particle dispersion 1 was performed with the exception that PENSEL GA100 (trade name, Tg: 58° C., acid value: 10 mg KOH/g, manufactured by Arakawa Chemical Industries, Ltd.) was used as the rosin ester resin to perform emulsification under a high-pressure environment at 120° C. with a high-pressure homogenizer, giving a rosin-based resin particle dispersion 7 having an added nonvolatile content of 25% by mass. The rosin-based resin particles in the dispersion had a volume average particle diameter ($D_{50}$) of 350 nm.

Preparation of Ink

The black pigment dispersion and the resin particle dispersion 1 prepared above were mixed with the following components. The "remainder" of ion-exchanged water is such an amount that the total amount of all the components constituting the ink becomes 100.0% by mass.

Black pigment dispersion (pigment content: 10.0% by mass) 40.0% by mass
Thermoplastic resin particle dispersion 1 (resin content: 25.0% by mass) 20.0% by mass
Glycerol 7.0% by mass
Pluronic L-31 (trade name, manufactured by ADEKA Corporation) 3.0% by mass
Acetylenol E100 (trade name, manufactured by Kawaken Fine Chemicals) 0.5% by mass
Ion-exchanged water remainder The components were thoroughly stirred and dispersed, and then subjected to pressure filtration through a microfilter with a pore size of 3.0 μm (manufactured by Fujifilm), giving a black ink.

Preparation of Assisting Liquid

Preparation of Assisting Liquid 1

The thermoplastic resin particle dispersion 1 and the rosin-based resin particle dispersion 1 prepared above were mixed with the following components. The remainder of ion-exchanged water is such an amount that the total amount of all the components constituting the assisting liquid becomes 100.0% by mass.

Thermoplastic resin particle dispersion 1 40.0% by mass
Rosin-based resin particle dispersion 1 8.0% by mass
Glycerol 7.0% by mass
Water-soluble resin: styrene-butyl acrylate-acrylic acid copolymer (acid value: 132 mg KOH/g, weight average molecular weight: 7,700, Tg: 78° C., solid content: 20%, neutralized by potassium hydroxide) 5% by mass
Pluronic L-31 (trade name, manufactured by ADEKA Corporation) 3.0% by mass
Acetylenol E100 (trade name, manufactured by Kawaken Fine Chemicals) 0.5% by mass
Ion-exchanged water remainder The components were mixed, thoroughly stirred, and dispersed, and the mixture was subjected to pressure filtration through a microfilter with a pore size of 3.0 μm (manufactured by Fujifilm), giving an assisting liquid 1.

Preparation of Assisting Liquids 2 to 21

The same procedure as for the assisting liquid 1 was performed with the exception that the types and the contents of the thermoplastic resin particle dispersion and the rosin-based resin particle dispersion and the contents of the water-soluble resin and Pluronic L-31 were each changed as shown in Table 1, giving assisting liquids 2 to 21. In the table, "content" is in terms of % by mass.

TABLE 1

| No. of assisting liquid | Thermoplastic resin particles Type | Content A | Rosin-based resin particles Type | Content B | Water-soluble resin Content C | L-31 Content D | A:B (mass ratio) |
|---|---|---|---|---|---|---|---|
| 1 | Thermoplastic resin particle dispersion 1 | 40 | Rosin-based resin particle dispersion 1 | 8 | 5 | 3 | 5:1 |

TABLE 1-continued

| No. of assisting liquid | Thermoplastic resin particles Type | Content A | Rosin-based resin particles Type | Content B | Water-soluble resin Content C | L-31 Content D | A:B (mass ratio) |
|---|---|---|---|---|---|---|---|
| 2 | Thermoplastic resin particle dispersion 1 | 40 | Rosin-based resin particle dispersion 1 | 8 | 0 | 3 | 5:1 |
| 3 | Thermoplastic resin particle dispersion 1 | 40 | Rosin-based resin particle dispersion 2 | 8 | 5 | 3 | 5:1 |
| 4 | Thermoplastic resin particle dispersion 1 | 40 | Rosin-based resin particle dispersion 3 | 8 | 5 | 3 | 5:1 |
| 5 | Thermoplastic resin particle dispersion 1 | 40 | Rosin-based resin particle dispersion 4 | 8 | 5 | 3 | 5:1 |
| 6 | Thermoplastic resin particle dispersion 1 | 40 | Rosin-based resin particle dispersion 5 | 8 | 5 | 3 | 5:1 |
| 7 | Thermoplastic resin particle dispersion 2 | 40 | Rosin-based resin particle dispersion 1 | 8 | 5 | 3 | 5:1 |
| 8 | Thermoplastic resin particle dispersion 1 | 40 | Rosin-based resin particle dispersion 1 | 2 | 5 | 3 | 20:1 |
| 9 | Thermoplastic resin particle dispersion 1 | 50 | Rosin-based resin particle dispersion 1 | 2 | 5 | 3 | 25:1 |
| 10 | Thermoplastic resin particle dispersion 1 | 10 | Rosin-based resin particle dispersion 1 | 20 | 5 | 3 | 1:2 |
| 11 | Thermoplastic resin particle dispersion 1 | 10 | Rosin-based resin particle dispersion 1 | 30 | 5 | 3 | 1:3 |
| 12 | Thermoplastic resin particle dispersion 1 | 40 | Rosin-based resin particle dispersion 6 | 8 | 5 | 3 | 5:1 |
| 13 | Thermoplastic resin particle dispersion 1 | 40 | Rosin-based resin particle dispersion 7 | 8 | 5 | 3 | 5:1 |
| 14 | Thermoplastic resin particle dispersion 1 | 40 | Rosin-based resin particle dispersion 1 | 8 | 5 | 0 | 5:1 |
| 15 | Thermoplastic resin particle dispersion 4 | 40 | Rosin-based resin particle dispersion 1 | 8 | 5 | 3 | 5:1 |
| 16 | Thermoplastic resin particle dispersion 5 | 40 | Rosin-based resin particle dispersion 1 | 8 | 5 | 3 | 5:1 |
| 17 | Thermoplastic resin particle dispersion 6 | 40 | Rosin-based resin particle dispersion 1 | 8 | 5 | 3 | 5:1 |
| 18 | Thermoplastic resin particle dispersion 7 | 40 | Rosin-based resin particle dispersion 1 | 8 | 5 | 3 | 5:1 |
| 19 | — | — | Rosin-based resin particle dispersion 1 | 40 | 5 | 3 | — |
| 20 | Thermoplastic resin particle dispersion 1 | 40 | — | — | 5 | 3 | — |
| 21 | Thermoplastic resin particle dispersion 3 | 40 | Rosin-based resin particle dispersion 1 | 8 | 5 | 3 | 5:1 |

Image Recording

Example 1

The image recording apparatus shown in FIG. 1 was used to record images. In the example, as the support member 102, a cylindrical-shaped drum made of aluminum alloy was used in consideration of the rigidity capable of withstanding the pressure at the time of transfer, dimensional accuracy, and characteristics required to reduce the rotation inertia to improve the control responsivity, for example. The material of the surface layer member 104 was prepared by coating a PET sheet having a thickness of 0.5 mm with a silicone rubber having a rubber hardness (durometer A) of 40° and a thickness of 0.2 mm (trade name: KE12, manufactured by Shin-Etsu Chemical Co., Ltd.). The surface was then subjected to plasma surface treatment with an atmospheric pressure plasma treatment apparatus (trade name: ST-7000, manufactured by Keyence Corporation) in conditions of a treatment distance of 5 mm, a plasma mode of high, and a treatment speed of 100 mm/sec. The surface was further subjected to surfactant treatment by 10-second immersion in an aqueous surfactant solution that was prepared by diluting a commercially available neutral detergent containing sodium alkylbenzene sulfonate with pure water so as to give a concentration of 3%. The surface was then dried to give a surface layer member 104. The prepared surface layer member 104 was fixed to the support member 102 through a double-sided pressure-sensitive adhesive tape. As the recording medium, VENT NOUVEAU V (trade name, manufactured by Nisshinbo Paper Products, basis weight: 157 g/m$^2$, arithmetic surface roughness Ra: 4 μm) was used.

First, from the ink jet device 103 and the ink jet device for an assisting liquid 107, the black ink and the assisting liquid 1 prepared above were applied to form a second intermediate image (solid image of 5 cm×5 cm) at a recording duty of 200% (each recording duty of the ink and the assisting liquid was 100%) on the intermediate transfer member 101. With the image recording apparatus used in the example, the condition in which 3.0 nanograms (ng) of an ink drop is applied to a unit area of 1/1,200 inch×1/1,200 inch at a resolution of 1,200 dpi×1,200 dpi is defined as a recording duty of 100%.

A liquid content was removed from the second intermediate image on the intermediate transfer member 101 by the blower 110, and concurrently the intermediate transfer member 101 was heated by the heater 112 provided in the intermediate transfer member 101. Subsequently, as the rotation of the intermediate transfer member 101 in the arrow direction, the recording medium 108 was brought into contact with the second intermediate image between the intermediate transfer member 101 and the pressure roller 113 in the image transfer region 131, and the second intermediate image was transferred from the intermediate transfer member 101 to the recording medium 108. In the example, the temperature of the intermediate transfer member 101 was 80° C. at the time of transfer. In other words, the second intermediate image brought into contact with the recording medium had a temperature of 80° C. The surface temperature of the intermediate transfer member 101 was measured with an infrared thermometer. The nip pressure between the intermediate transfer member 101 and the pressure roller 113 was adjusted to 3 kg/cm².

Example 2

The image recording apparatus shown in FIG. 1 was used to apply the reaction liquid 1 prepared above from the roller type applicator 105 onto the intermediate transfer member 101 at 1.0 g/m². Then, the same procedure as in Example 1 was performed with the exception that the black ink and the assisting liquid 2 were applied from the ink jet device 103 and the ink jet device for an assisting liquid 107, respectively, onto the intermediate transfer member 101, recording images.

Examples 3 to 22, Comparative Examples 1 to 3

The same procedure as in Example 2 was performed with the exception that the assisting liquid, the reaction liquid, and the temperature of the intermediate transfer member at the time of transfer were changed as shown in Table 2, recording images. In Table 2, Tgs and the acid values indicated in the columns of rosin-based resin particles are Tgs and the acid values of the rosin-based resins constituting the corresponding rosin-based resin particles.

Image Evaluation
Evaluation of Intermediate Image Transferability

To evaluate the transferability of each second intermediate image prepared by image recording as above in Examples and Comparative Examples, the transfer rate of the second intermediate image transferred to a recording medium was determined. The transfer rate was calculated from the ratio of an area of a second intermediate image on the intermediate transfer member before transfer and a residual area of the second intermediate image on the intermediate transfer member after transfer. In other words, the intermediate transfer member after the transfer step was observed under an optical microscope to determine a residual area of the second intermediate image on the intermediate transfer member, and the transfer rate was calculated in accordance with the equation [1−{(residual area of second intermediate image on intermediate transfer member after transfer)/(area of second intermediate image on intermediate transfer member before transfer)}]×100. The criteria are as shown below. In the present invention, a case evaluated as rank C or lower was regarded as an unacceptable level where an exposed paper surface was visually identified in the image area on a printed material. The results are shown in Table 2.
A: The transfer rate was 95% or more.
B: The transfer rate was not less than 80% and less than 95%.
C: The transfer rate was not less than 50% and less than 80%.
D: The transfer rate was less than 50%.
Evaluation of Image Quality An image was observed by the following procedure, and the image quality was evaluated by identifying the presence or absence of color unevenness caused by image shift.

Each image prepared in Examples and Comparative Examples was observed under an optical microscope to identify whether color unevenness was caused or not. When image shift occurs, color unevenness is caused in a solid image. When the transferability was insufficient, and the state of color unevenness was failed to be identified in an image on a recording medium, the image on the intermediate transfer member before transfer was evaluated. The criteria are as shown below. In the present invention, a case evaluated as rank C or lower was regarded as an unacceptable level. The results are shown in Table 2.
A: An image has no color unevenness and is a good solid image.
B: An image partly has color unevenness but is within an acceptable level.
C: An image has white spots, and a solid image is not formed.

TABLE 2

| | No. of assisting liquid | No. of reaction liquid | Thermoplastic resin particles | | Rosin-based resin particles | | | Transfer temperature (° C.) | Evaluation result | |
|---|---|---|---|---|---|---|---|---|---|---|
| | | | Tg (° C.) | Particle diameter | Tg (° C.) | Particle diameter | Acid value (mgKOH/g) | | Transferability | Image shift |
| Example 1 | 1 | — | 30 | 220 | −24 | 250 | 5 | 80 | A | B |
| Example 2 | 2 | 1 | 30 | 220 | −24 | 250 | 5 | 80 | A | A |
| Example 3 | 1 | 1 | 30 | 220 | −24 | 250 | 5 | 80 | A | A |
| Example 4 | 1 | 2 | 30 | 220 | −24 | 250 | 5 | 80 | A | A |
| Example 5 | 3 | 1 | 30 | 220 | −24 | 200 | 5 | 80 | A | A |
| Example 6 | 4 | 1 | 30 | 220 | −24 | 300 | 5 | 80 | A | A |
| Example 7 | 5 | 1 | 30 | 220 | −37 | 240 | 12 | 80 | A | A |
| Example 8 | 6 | 1 | 30 | 220 | −21 | 255 | 21 | 80 | A | A |
| Example 9 | 7 | 1 | 60 | 210 | −24 | 250 | 5 | 80 | A | A |
| Example 10 | 7 | 1 | 60 | 210 | −24 | 250 | 5 | 70 | A | A |
| Example 11 | 8 | 1 | 30 | 220 | −24 | 250 | 5 | 80 | A | A |
| Example 12 | 9 | 1 | 30 | 220 | −24 | 250 | 5 | 80 | B | A |
| Example 13 | 10 | 1 | 30 | 220 | −24 | 250 | 5 | 80 | A | A |
| Example 14 | 11 | 1 | 30 | 220 | −24 | 250 | 5 | 80 | B | A |
| Example 15 | 12 | 1 | 30 | 220 | −12 | 255 | 36 | 80 | B | A |
| Example 16 | 13 | 1 | 30 | 220 | 58 | 350 | 10 | 60 | A | A |
| Example 17 | 13 | 1 | 30 | 220 | 58 | 350 | 10 | 45 | B | A |

TABLE 2-continued

|  | No. of assisting liquid | No. of reaction liquid | Thermoplastic resin particles | | Rosin-based resin particles | | | Transfer temperature (° C.) | Evaluation result | |
|---|---|---|---|---|---|---|---|---|---|---|
|  |  |  | Tg (° C.) | Particle diameter | Tg (° C.) | Particle diameter | Acid value (mgKOH/g) |  | Transferability | Image shift |
| Example 18 | 14 | 1 | 30 | 220 | −24 | 250 | 5 | 80 | A | B |
| Example 19 | 15 | 1 | 15 | 475 | −24 | 250 | 5 | 80 | A | A |
| Example 20 | 16 | 1 | 24 | 160 | −24 | 250 | 5 | 80 | A | A |
| Example 21 | 17 | 1 | 43 | 54 | −24 | 250 | 5 | 80 | A | A |
| Example 22 | 18 | 1 | 46 | 30 | −24 | 250 | 5 | 80 | A | A |
| Comparative Example 1 | 19 | 1 | — | — | −24 | 250 | 5 | 80 | D | A |
| Comparative Example 2 | 20 | 1 | 30 | 220 | — | — | — | 80 | C | A |
| Comparative Example 3 | 21 | 1 | 100 | 230 | −24 | 250 | 5 | 90 | D | A |

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2016-194469, filed Sep. 30, 2016, which is hereby incorporated by reference herein in its entirety.

What is claimed is:

1. An image recording method comprising:
   a first intermediate image forming step of applying an ink onto an intermediate transfer member to form a first intermediate image;
   a second intermediate image forming step of applying a transfer assisting liquid comprising thermoplastic resin particles and rosin-based resin particles to the first intermediate image formed on the intermediate transfer member to form a second intermediate image; and
   a transfer step of bringing the second intermediate image formed on the intermediate transfer member into contact with a recording medium, peeling off the second intermediate image from the intermediate transfer member while a contact state with the recording medium is maintained, and transferring the second intermediate image to the recording medium,
   wherein, in the transfer step, the second intermediate image brought into contact with the recording medium has a temperature of not less than a glass transition temperature of the thermoplastic resin particles.

2. The image recording method according to claim 1, wherein the first intermediate image forming step includes a step of applying the ink onto the intermediate transfer member, and a step of applying a reaction liquid comprising a component that increases ink viscosity onto the intermediate transfer member.

3. The image recording method according to claim 1, wherein the transfer assisting liquid comprises the thermoplastic resin particles and the rosin-based resin particles at a mass ratio of 20:1 to 1:2.

4. The image recording method according to claim 1, wherein a rosin-based resin constituting the rosin-based resin particles has an acid value of 50 mg KOH/g or less.

5. The image recording method according to claim 1, wherein, in the transfer step, the second intermediate image brought into contact with the recording medium has a temperature of not less than a glass transition temperature of a rosin-based resin constituting the rosin-based resin particles.

6. The image recording method according to claim 2, wherein the first intermediate image forming step includes a step of applying the reaction liquid onto the intermediate transfer member, and a step of applying the ink onto the intermediate transfer member with the reaction liquid.

7. The image recording method according to claim 1, wherein the ink is applied by an ink jet method.

8. A transfer assisting liquid for transfer-type image recording, the liquid comprising:
   thermoplastic resin particles; and
   rosin-based resin particles.

9. The transfer assisting liquid according to claim 8 used for the image recording method according to claim 1.

10. A liquid set for transfer-type image recording, the set comprising:
    a transfer assisting liquid comprising thermoplastic resin particles and rosin-based resin particles; and
    an ink.

11. The liquid set according to claim 10 used for the image recording method according to claim 1.

12. The liquid set according to claim 10, further comprising a reaction liquid.

13. The liquid set according to claim 10, wherein the ink is an ink for ink jetting.

14. The image recording method according to claim 1, wherein the transfer assisting liquid comprises a water-soluble resin.

15. The image recording method according to claim 1, wherein a thermoplastic resin constituting the thermoplastic resin particles is at least one selected from the group consisting of homopolymers of polyolefin, polystyrene, polyurethane, polyester, polyether, polyamide, polyvinyl alcohol, polyvinyl chloride, polyvinyl acetate, polyvinylpyrrolidone, poly(meth)acrylic acid and salts thereof, polyalkyl (meth)acrylate, and polydiene; and copolymers thereof.

16. The image recording method according to claim 1, wherein the transfer assisting liquid comprises water, and the content of the water in the transfer assisting liquid is 30% by mass or more to 97% by mass or less relative to the total mass of the transfer assisting liquid.

17. The image recording method according to claim 1, wherein a rosin-based resin constituting the rosin-based resin particles has an acid value of 50 mg KOH/g or less, and wherein the transfer assisting liquid comprises a water-soluble resin.

18. The transfer assisting liquid according to claim 8, wherein the thermoplastic resin particles and the rosin-based resin particles are contained at a mass ratio of 20:1 to 1:2.

19. The transfer assisting liquid according to claim 8, wherein a rosin-based resin constituting the rosin-based resin particles has an acid value of 50 mg KOH/g or less.

20. The transfer assisting liquid according to claim 8, further comprising a water-soluble resin.

21. The transfer assisting liquid according to claim 8, wherein a thermoplastic resin constituting the thermoplastic resin particles is at least one selected from the group consisting of homopolymers of polyolefin, polystyrene, polyurethane, polyester, polyether, polyamide, polyvinyl alcohol, polyvinyl chloride, polyvinyl acetate, polyvinylpyrrolidone, poly(meth)acrylic acid and salts thereof, polyalkyl (meth)acrylate, and polydiene; and copolymers thereof.

22. The transfer assisting liquid according to claim 8, further comprising water, wherein the content of the water in the transfer assisting liquid is 30% by mass or more to 97% by mass or less relative to the total mass of the transfer assisting liquid.

23. The transfer assisting liquid according to claim 8,
wherein a rosin-based resin constituting the rosin-based resin particles has an acid value of 50 mg KOH/g or less, and
wherein the transfer assisting liquid comprises a water-soluble resin.

* * * * *